US012485431B2

(12) United States Patent
Heimberg et al.

(10) Patent No.: US 12,485,431 B2
(45) Date of Patent: Dec. 2, 2025

(54) DISCHARGE DEVICE FOR A REACTION VESSEL UNIT, CENTRIFUGE AND METHOD FOR CLEANING A REACTION VESSEL UNIT

(71) Applicant: BlueCatBio GMBH, Neudrossenfeld (DE)

(72) Inventors: Wolfgang Heimberg, Ebersberg (DE); Frank Feist, Lebanon, NH (US); Wolfgang Mann, Neudrossenfeld (DE)

(73) Assignee: BlueCatBio GMBH, Neudrossenfeld (DE)

( * ) Notice: Subject to any disclaimer, the term of this patent is extended or adjusted under 35 U.S.C. 154(b) by 0 days.

(21) Appl. No.: 18/835,531

(22) PCT Filed: Feb. 2, 2023

(86) PCT No.: PCT/EP2023/052569
§ 371 (c)(1),
(2) Date: Aug. 2, 2024

(87) PCT Pub. No.: WO2023/148272
PCT Pub. Date: Aug. 10, 2023

(65) Prior Publication Data

US 2025/0114801 A1 Apr. 10, 2025

(30) Foreign Application Priority Data

Feb. 4, 2022 (DE) ..................... 10 2022 102 701.5

(51) Int. Cl.
*B04B 5/04* (2006.01)
*B04B 15/06* (2006.01)

(52) U.S. Cl.
CPC ............ *B04B 5/0442* (2013.01); *B04B 15/06* (2013.01)

(58) Field of Classification Search
CPC ..... B04B 5/0442; B04B 15/06; B04B 5/0407; B04B 7/04; B08B 13/00; B08B 3/02;
(Continued)

(56) References Cited

U.S. PATENT DOCUMENTS

2016/0187330 A1* 6/2016 Wang .............. G01N 33/54326
506/3

FOREIGN PATENT DOCUMENTS

DE 20 2014 010 544 U1 1/2016
DE 10 2017 113 583 A1 6/2017
(Continued)

OTHER PUBLICATIONS

International Preliminary Report on Patentability, mailed on May 8, 2024, from International Application No. PCT/EP2023/052569, filed on Feb. 2, 2023. 13 pages.
(Continued)

*Primary Examiner* — Duane Smith
*Assistant Examiner* — Shuyi S. Liu
(74) *Attorney, Agent, or Firm* — HoustonHogle LLP

(57) ABSTRACT

The invention relates to a discharge device (30) for a reaction vessel unit (21) which has a plurality of reaction vessels (37), wherein the reaction vessels (37) each have an opening (38) which lie in a common opening plane (39), wherein the discharge device (30) has a discharge plate (31) which is designed in such a way that it can be arranged or is arranged opposite the openings (38) of the reaction vessels (37) in a centrifuge (1) and is designed such that it rotates with the reaction vessel unit (21) during centrifuging and liquid escaping from the reaction vessels (37) is collected and drained off by the discharge plate (31) due to the centrifugal acceleration. The invention also relates to a centrifuge (1) for cleaning a reaction vessel unit (21), having a drive, a rotor (20) which can be coupled or is coupled to
(Continued)

Figure 1A:
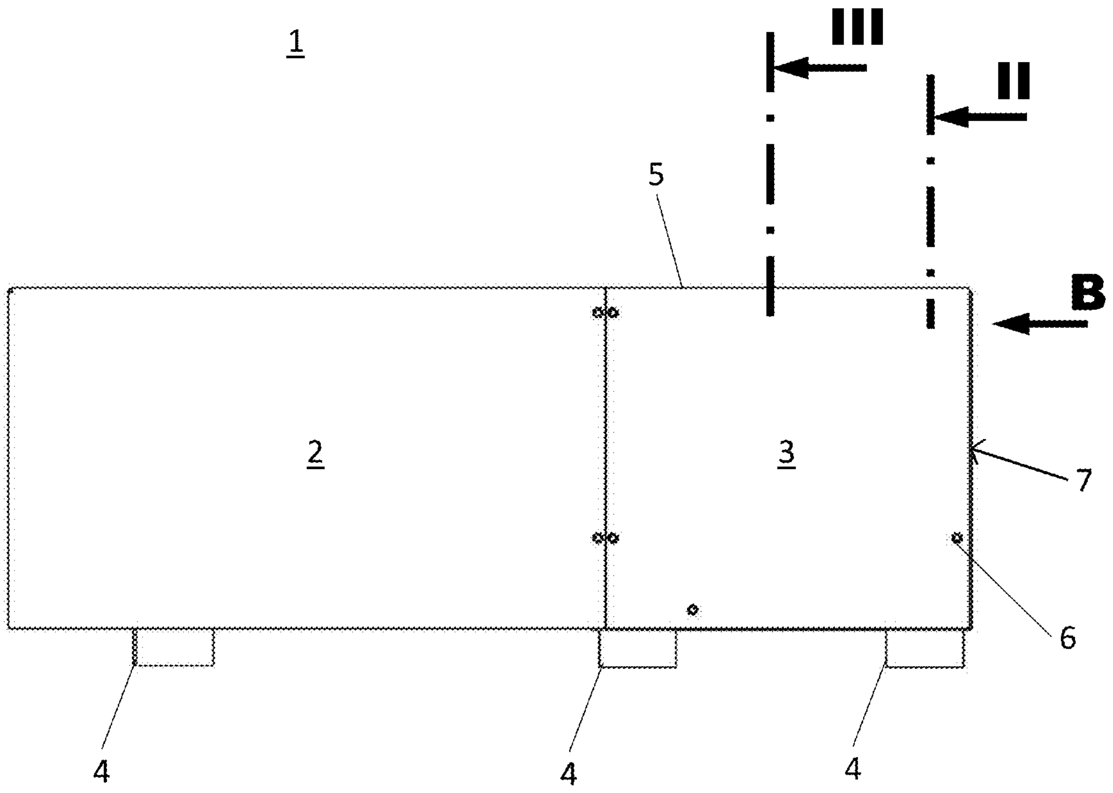

the drive, wherein the rotor (20) is designed to receive the reaction vessel unit (21) with the discharge device (30). The invention further relates to a method for cleaning a reaction vessel unit (21), wherein the reaction vessel unit (21) is received on a rotor (20) of the centrifuge (1) with its openings (38) facing outwards from a rotation axis (11) of the rotor (20); and the rotor (20) with the reaction vessel unit (21) arranged thereon is rotated in the centrifuge (1), so that a liquid contained in the reaction vessels (37) is ejected, and wherein the ejected liquid is collected by a discharge device (30) with a discharge plate (31), which is arranged radially opposite the opening plane (39) of the reaction vessels (37) and rotates together with the reaction vessel unit (21), and is discharged along the discharge plate (31).

18 Claims, 12 Drawing Sheets

(58) Field of Classification Search
CPC .. B08B 1/32; B08B 3/04; B08B 9/093; B01D 47/06
USPC .......................................................... 494/60, 64
See application file for complete search history.

(56) References Cited

FOREIGN PATENT DOCUMENTS

| | | | |
|---|---|---|---|
| DE | 10 2021 124 023.9 | | 3/2023 |
| KR | 1020210079399 | A | 6/2021 |
| WO | WO 2017/125598 | A1 | 7/2017 |

OTHER PUBLICATIONS

International Search Report of the International Searching Authority mailed on Apr. 3, 2023, from International Application No. PCT/EP2023/052569, filed on Feb. 2, 2023. 6 pages.
German Search Report mailed on Dec. 23, 2022, from German Patent Application No. 10 2022 102 701.5, filed on Feb. 4, 2022. 10 pages.
International Preliminary Examination Report (IPER) in German language, mailed May 8, 2024 from the European Patent Office as International Preliminary Examining Authority (IPEA), from International Application No. PCT/EP2023/052569, filed on Feb. 2, 2023. 12 pages.
Korean Office Action, mailed on Oct. 31, 2024, from Korean Application No. 10-2024-7029564, filed on Sep. 3, 2024. 11 pages.

* cited by examiner

DISCHARGE DEVICE FOR A REACTION VESSEL UNIT, CENTRIFUGE AND METHOD FOR CLEANING A REACTION VESSEL UNIT

RELATED APPLICATIONS

This application is a § 371 National Phase Application of International Application No. PCT/EP2023/052569, filed on Feb. 2, 2023, now International Publication No. WO 2023/148272 A1, published on Aug. 10, 2023, which International Application claims priority to German Application 10 2022 102 701.5, filed on Feb. 4, 2022, both of which are incorporated herein by reference in their entirety.

The present invention relates to a discharge device for a reaction vessel unit, a centrifuge and a method for cleaning a reaction vessel unit.

It is known that reaction vessel units comprising several reaction vessels, such as microtiter plates (MTPs) with their wells, are purified by centrifuging. The MTPs are picked up on a rotor in a rotor chamber of a centrifuge in such a way that the openings of the reaction vessels face away from an axis of rotation of the rotor and centrifuged at a speed of up to several 1000 rpm.

During centrifuging, the centrifuged contents of the reaction vessels are collected by a wall of the rotor chamber. Some of the substances remaining on the walls and surfaces of the rotor chamber flow off and collect in the lower area, but they can also drip down from above and enter an MTP in the rotor chamber. If several MTPs are cleaned one after the other in the centrifuge, there is also a risk of cross-contamination if centrifugate from one MTP drips into another MTP.

The rotation of the rotor creates air vortices in every centrifuge. If liquid contents are ejected from the reaction vessels during rotation, these air vortices cause aerosols to form. These are also the cause of cross-contamination. In genomic applications (typically amplification-based, e.g. PCR), aerosols are therefore the driving force behind contamination.

It has also been shown that MTPs cleaned in the centrifuge can still be wetted on the surface even after the cells have been completely emptied. This can make further use more difficult, for example if the MTPs are subsequently sealed with a film. The foil is typically stuck on to cover the openings of the cells. This can be for sterile intermediate storage of the MTPs before further use or after filling with a test liquid to isolate the test regime. However, the wetted surface makes it difficult to cover the MTPs with a film.

DE 10 2017 113 583 A1 discloses a centrifuge in which the housing below the rotor has a discharge channel and the inner surfaces of the housing adjacent to the channel form a funnel which opens into the channel. This allows the centrifugate produced in the rotor chamber to be collected and discharged more easily.

It is known from DE 10 2021 124 023.9, unpublished at the time of this application, to supply a cleaning solution to the rotor chamber in such a way that the cleaning solution is distributed in the rotor chamber by rotating the rotor. Residues of the centrifugate can thus be removed from the walls and surfaces of the rotor chamber by regular, frequent rinsing with cleaning agents.

DE 20 2014 010 544 U1 discloses a centrifuge for cleaning a reaction vessel unit, in which a gap is provided between the inner surface and a rotor, so that a wind is generated by the rotation of the rotor, which drives the fluid ejected on the inner surface to a drain. The outlet is connected to a suction pump for extracting the fluid.

For reasons of hygiene, comparatively frequent cleaning cycles are required, which leads to idle times and high operating costs. This procedure will be unavoidable for diagnostic applications in particular.

One task of the invention is to reduce or reliably prevent the risk of contamination of a reaction vessel unit in a centrifuge.

A further task of the invention is to minimise or reliably prevent the wetting of a reaction vessel unit in a centrifuge.

A further task of the invention is to minimise the dwell time for aerosols in the centrifuge or to prevent the occurrence of aerosols.

A further task of the invention is to minimise the internal surfaces in the housing that can come into contact with the ejected liquid.

A further task of the invention is to minimise the volume of the space into which liquid particles can penetrate.

A further task of the invention is to reduce or eliminate the effort required to clean the rotor chamber of a centrifuge for MTP.

A further task of the invention is to keep ejected fluid away from all elements of the device, such as the housing, the rotor and the rotor axis, so that these parts do not corrode or are exposed to other chemical interactions with the ejected fluid, in order, among other things, to minimise costs incurred by surface treatments of the elements of the device for chemical protection and to accelerate and simplify the manufacturing process.

One or more of the tasks is solved by the objects of the independent claims. Advantageous further embodiments are indicated in the respective subclaims.

According to a first aspect of the invention, a discharge device is proposed for a reaction vessel unit, which has a plurality of reaction vessels, wherein the reaction vessels each have an opening which lie in a common opening plane. The discharge device has a discharge plate which is designed such that it can be arranged or is arranged opposite the openings of the reaction vessels in a centrifuge, and is designed such that it rotates with the reaction vessel unit during centrifuging and liquid escaping from the reaction vessels is collected and discharged by the discharge plate due to the centrifugal acceleration.

For the purposes of the invention, a discharge plate is a structure which has a surface opposite the opening plane of the reaction vessels. Liquid ejected from the reaction vessels by centrifugal acceleration can be collected on the surface and flow along it under the effect of the centrifugal acceleration. In the simplest case, the discharge plate can be flat or essentially flat, arranged parallel to the opening plane and open at the edge, in particular the flanks. The collecting surface is preferably non-rotatably connected to the unit comprising the rotor and the reaction vessel unit and thus rotates at the same rotational speed as the rotor. The collecting surface can also rotate at a different rotational speed than the rotor. As the flank-side edges of the discharge plate are radially furthest away from the rotation axis, the collected liquid is driven from the centre to the flank-side edges of the discharge plate due to the centrifugal acceleration and from there is propelled into the rotor chamber.

Ends of the rotor and thus also of the reaction vessel unit arranged thereon and of the discharge device which are opposite each other in the axial direction of the rotation axis are referred to as end faces in the context of the application, while those ends of the rotor and of the reaction vessel unit arranged thereon and of the discharge device which are opposite each other transversely to the rotation axis are referred to as flank sides in the context of the application.

In modifications, the discharge plate can also be curved or kinked or inclined as long as the collected liquid is directed away from an area opposite the opening plane of the reaction vessels. The liquid discharged by the discharge plate can be collected on the walls of the rotor chamber. Since the discharge plate is arranged opposite the openings of the reaction vessels, the discharge plate can also intercept liquid dripping from a wall, in particular the upper wall, of the rotor chamber and prevent the reaction vessel unit from being contaminated by the liquid. Even if several reaction vessel units are cleaned one after the other, cross-contamination can be prevented effectively and easily. The discharge device can be reused after cleaning. The discharge device can be made of plastic or metal, for example. Chemicals that break down or inactivate organic molecules, for example, can be used for cleaning, provided that the material of the discharge device is resistant to the chemical. An autoclave can also be used for cleaning, provided that the material of the discharge device is resistant to the temperatures used.

The discharge plate can be arranged at an angle with respect to the opening plane so that collected liquid is discharged along the inclined discharge plate in the axial direction of a rotation axis of a rotor of the centrifuge due to the centrifugal acceleration in the centrifuge. The axial direction refers to a rotation axis of a rotor of the centrifuge. In the sense of the invention, inclined means that a height or a distance of the discharge plate varies with respect to the opening plane of the reaction vessels. The incline can be continuous or discontinuous (bent), constant (straight) or variable along its length (curved). It can run from one end of the discharge device or the reaction vessel unit to the other end (on one side) or from the centre to both ends (on both sides). Since the opening plane of the reaction vessels is usually parallel to the rotation axis when the reaction vessel unit is accommodated in the centrifuge, the incline also runs at an angle to the rotation axis. As the discharge plate is inclined in the axial direction with respect to the opening plane or the rotation axis, the collected liquid is driven along the incline by the centrifugal acceleration to one end face of the rotor or the rotor chamber, where it can be collected or ejected. The walls of the rotor chamber surrounding the rotor are less wetted, so the risk of cross-contamination can be further reduced.

If the space above the reaction vessel unit within the discharge device is completely closed or only closed up to the discharge opening, the rotor chamber will not come into contact with liquid and contamination is ruled out in this respect.

It should be noted that the discharge in the axial direction does not exclude a superimposed movement of the liquid transverse to the rotation axis. In other words, the entire discharge movement of the liquid at the discharge plate is a combination of the axial discharge and the discharge transverse to the axis. Therefore, it may be advantageous if flanks of the diverter extending laterally along the rotation axis are drawn downwardly from the discharge plate to form an obstacle to movement of the liquid transverse to the rotation axis. In this way, collection of the collected liquid at an axial end can be favoured by the liquid drained off transversely to the axis also being drained off axially at the downwardly drawn flanks. This can further improve the concentration of the liquids at one end face.

In particular, the flanks and end faces of the discharge device can be designed to be flush with an edge of the reaction vessel unit. In other words, if the reaction vessel unit with the discharge device is placed on the rotor of the centrifuge, the discharge device formed in this way can be used to create a closed collecting chamber which is isolated from the rotor chamber. The rotor chamber is not or hardly wetted, so the effort required to clean the rotor chamber of a centrifuge for reaction vessel units can be reduced or minimised. Since the discharge device also rotates, the air in the rotor chamber is not or hardly swirled, therefore wetting of the surfaces of the reaction vessel units during centrifuging can be avoided. With little or no vortex formation, aerosol formation in the collection chamber is consequently reduced or completely avoided.

At least one discharge opening can be formed on an end face towards which the discharge plate rises. The discharge opening is preferably flush or essentially flush with the inside of the discharge plate. Captured and drained liquid is forced outwards and can be collected on the front side or drained further. As the outer (flank-side) ends are located radially further outwards than the centre of the end face during centrifugation, the liquid will preferably collect there and can be best discharged there. It is therefore advantageous if two discharge openings are provided at the outer (flank-side) ends of the end face. The discharge openings can be on the end face, i.e. axially, or on the flank side, i.e. transverse to the axis. An opening at the top is also conceivable in principle, but means would then have to be provided to prevent dripping back from above and to avoid contamination.

The discharge opening can have a spout that protrudes beyond the end face. Such a spout moves on a circular path during centrifugation. Collected and discharged substance is propelled outwards and can be discharged via the spout into an annular collecting channel in which the spout runs. Contamination of the rotor chamber can be avoided even more effectively and the cleaning effort further reduced. As explained above, it is advantageous if two discharge openings are provided, each with such a spout.

In embodiments, the discharge device can be placed loosely, preferably positively, on the reaction vessel unit. In this case, the discharge device can be provided separately from the centrifuge. The reaction vessel unit can be prepared for centrifuging outside of the centrifuge with the discharge device.

In further embodiments, the discharge device can be detachably connected to the reaction vessel unit. Here, too, the discharge device can be provided separately from the centrifuge. The reaction vessel unit can be prepared for centrifuging with the discharge device in a loss-proof manner. The connection can, for example, be a clip connection, a plug connection, a snap connection or a sliding connection.

In other embodiments, the discharge device can be detachably connected to a rotor of a centrifuge. In this way, the rotor can be prepared to accommodate a reaction vessel unit. The discharge device can be removed for cleaning and is then ready for use again. The rotor can also be advantageously cleaned with the discharge device removed.

In further embodiments, the discharge device can be integrated with a rotor of a centrifuge. In this case, the rotor is ready to receive a reaction vessel unit without further preparation, and work steps in the laboratory can be simplified. Cleaning of the discharge device and/or the rotor chamber can be carried out together or separately by rinsing in the centrifuge or externally.

The discharge device can also be designed in several parts for easy removal and cleaning.

In still further embodiments, the discharge device can be connected or connectable to a rotor shaft of a centrifuge. The connection can be made, for example, by a cage or forked body or retaining bracket that can be mounted or flange-mounted in the centrifuge (on the rotor shaft) and accommodates the discharge device, or the discharge device itself has a bracket that can be mounted on the rotor shaft so that it cannot rotate. Here, too, the rotor is ready to receive a reaction vessel unit without any further preparation; it is not necessary to handle the cover on the reaction vessel unit or on the rotor. The rotor and discharge device can be cleaned separately. Work steps in the laboratory can be simplified. Cleaning can be carried out by rinsing in the centrifuge or externally (after disassembly from the rotor shaft).

A further aspect of the invention relates to a centrifuge for cleaning a reaction vessel unit, with a drive and a rotor which can be coupled to the drive. The rotor is designed to accommodate a reaction vessel unit with a discharge device as described above. The centrifuge has the same advantages as the discharge device.

A collecting device may be provided, which is arranged in a rotor chamber of the centrifuge in which the rotor rotates and which is designed to collect liquid discharged by the discharge device. The collecting device can be designed depending on the type of liquid discharged by the discharge device. In particular, the collecting device can be designed to collect liquid that emerges from a discharge opening or spout of the discharge device during centrifuging.

For example, the collecting device can have an annular channel open to the rotor chamber and concentric to the rotation axis, which is located opposite a discharge opening of the discharge device.

The channel can receive the collected and discharged substances from the discharge device without contaminating the rotor chamber. In particular, the channel can have an annular opening in which a spout of the discharge device, from which liquid emerges during centrifuging, can be accommodated. Even without a spout, the discharged substances may be able to enter the channel simply due to the speed of the liquid and suitable arrangement.

The channel of the collecting device can be located opposite the discharge opening of the discharge device in the axial direction. In this way, the channel can accommodate a spout that extends in an axial direction from the discharge device and rotates in a circle when the rotor rotates. The liquid can be collected even more cleanly and safely. Since the channel receives the spout axially outside the end wall of the discharge device, liquid can pass from the channel onto the spout, but not onto an outer surface of the discharge device.

The channel can have an annular opening formed axially towards the rotor chamber, wherein the annular opening has an undercut radially inwards and/or radially outwards. This means that liquids can be collected even more safely and can flow freely and unhindered downwards in the channel, where they can be collected and, if necessary, drained or removed.

Liquid can be drained directly from the collecting device to the outside using a discharge device, which is formed at a lower end of the collecting device.

A further aspect of the invention relates to a method for cleaning a reaction vessel unit which has a plurality of reaction vessels, wherein the reaction vessels each have an opening which lie in a common opening plane, wherein the reaction vessel unit is received on a rotor of the centrifuge with its openings pointing outwards from a rotation axis of the rotor, and the rotor with the reaction vessel unit arranged thereon is rotated in the centrifuge so that a liquid contained in the reaction vessels is centrifuged out. With a discharge device with a discharge plate, which is arranged radially opposite the opening plane of the reaction vessels and rotates together with the reaction vessel unit, the ejected liquid is collected and discharged along the discharge plate. In this process, the discharge device and/or the centrifuge is preferably designed according to the description of the above aspects of the invention. The method has essentially the same advantages and effects as the above-described discharge device and/or centrifuge. The reaction vessel unit can be mounted on the rotor in a manner known per se by means of positive-locking elements, such as rail-like clamps, into which the reaction vessel unit is pushed. For this purpose, an end wall of the rotor chamber can have a loading window through which the reaction vessel unit can be pushed into and pulled out of the rotor chamber. The use of the discharge device and the execution of the method depends on the type of design and arrangement of the discharge device and may include a loose or fixed attachment of the discharge device to the reaction vessel unit before or after the reaction vessel unit is arranged on the rotor, a detachable or non-detachable attachment of the discharge device to the rotor before or (only in the case of a detachable attachment) after the reaction vessel unit is arranged on the rotor, an attachment of the discharge device to a rotor shaft of the drive separately or together with the rotor. For example, a discharge device can be permanently attached to the rotor of the centrifuge. In this case, the reaction vessel unit is simply placed in the centrifuge on the rotor under the discharge plate of the deflector device. In other cases, the diverter device may form an assembly with the reaction vessel unit which is assembled outside the centrifuge and loaded into and unloaded from the centrifuge together.

The discharge device can be cleaned after one or more centrifuging processes. Cleaning can be carried out by autoclaving and/or by chemical means and/or by irradiation. Cleaning the discharge device is simpler and less expensive than cleaning the entire centrifuge or the entire rotor chamber with rotor. Since the discharge device is provided, cleaning intervals of the centrifuge itself or the rotor chamber can be extended, especially if the discharge device forms a closed collecting chamber from which no or only little liquid enters the rotor chamber itself. A collecting device, which is provided within the rotor chamber of the centrifuge for collecting drained liquid from the discharge device, can be cleaned together with the discharge device or separately from it by the same or a different method. In a particularly simple way, the discharge device can be cleaned by centrifuging a reaction vessel unit filled with a cleaning solution. The collecting device can also be cleaned via the cleaning solution emerging from the discharge device.

A centrifuge rotor chamber can be cleaned after a specified number of centrifuging processes. Cleaning can be carried out by rinsing with a rinsing solution or by separately cleaning dismantled parts of the centrifuge that border the rotor chamber. Examples of suitable cleaning methods are autoclaving, chemical agents (biocides) or irradiation. Since the discharge device is provided, the specified number of centrifuging processes after which cleaning takes place can be greater, meaning that cleaning intervals of the centrifuge or rotor chamber can be extended. A collecting device, which is provided inside the rotor chamber for collecting drained liquid from the discharge device, can be cleaned in the same operation or separately using a different process. Here, too, it is possible to clean the rotor chamber by centrifuging a reaction vessel unit filled with a cleaning solution. This process is particularly easy to carry out if the discharge device is open at the flanks, as the cleaning solution can then easily enter the rotor chamber. If the discharge device is closed, the discharge device can be removed from the rotor before the cleaning cycle with cleaning solution so that the cleaning solution can reach the inner walls of the rotor chamber. If the rotor has two receiving locations for reaction vessel units, but only one of the receiving locations is provided with a discharge device forming a closed collection chamber, the reaction vessel units can be placed on the receiving location with the discharge device for cleaning the reaction vessel units, while the reaction vessel unit with the cleaning solution is placed on the receiving location without the discharge device for cleaning the rotor chamber. To clean the collecting device in the rotor chamber, a cleaning solution can be dispensed with if the rotor or the discharge device is aerodynamically designed in such a way that the collecting device (for example a channel described above) is cleaned (blown out) by an air flow generated during rotation.

Figure 1B:
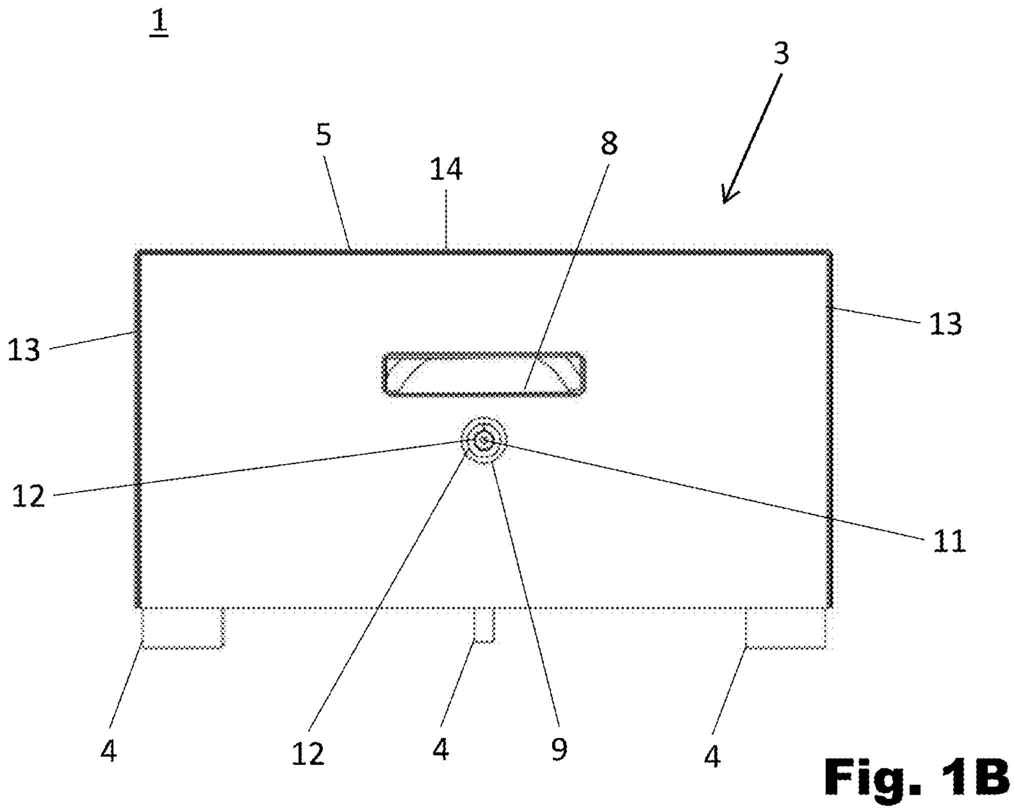
Figure 2:
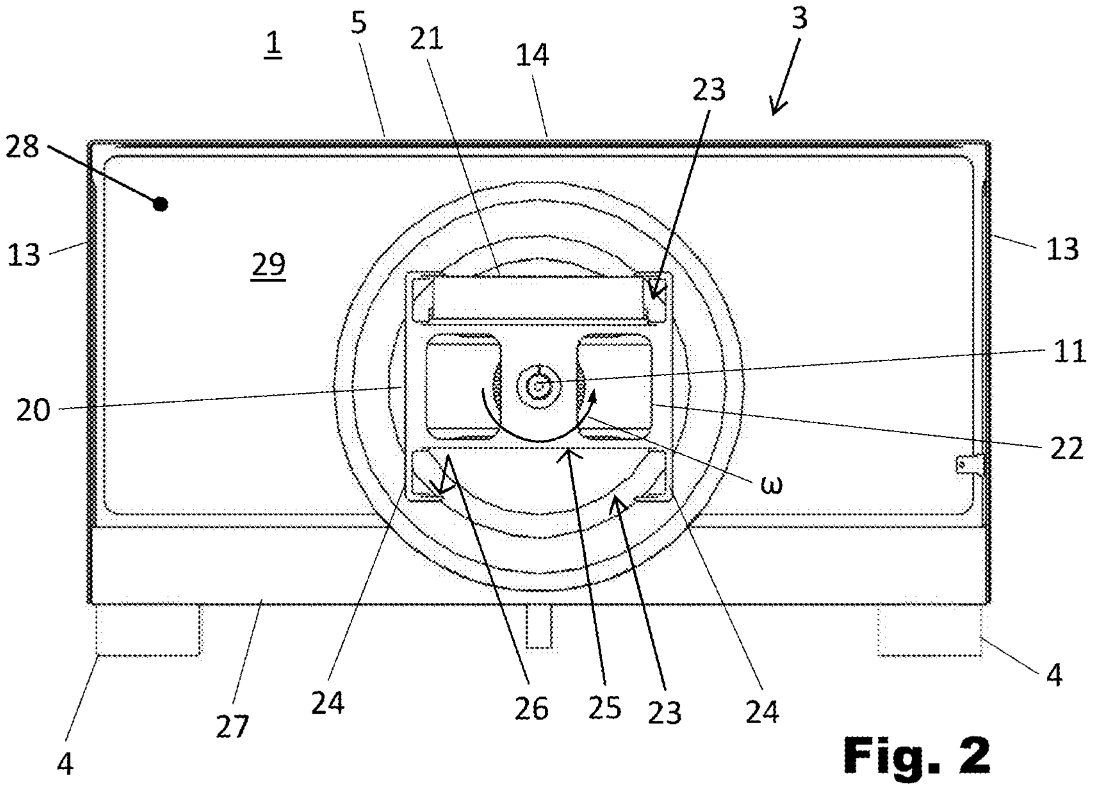
Figure 3:
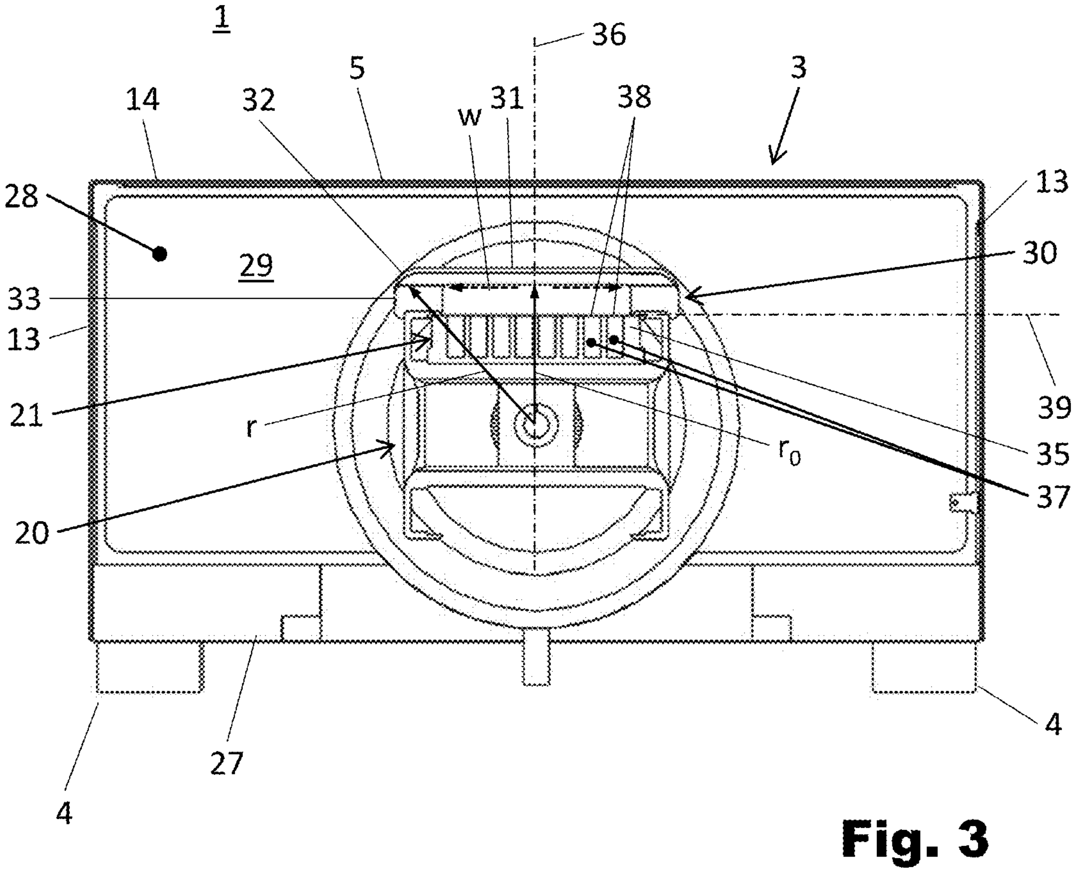
Figure 4A:
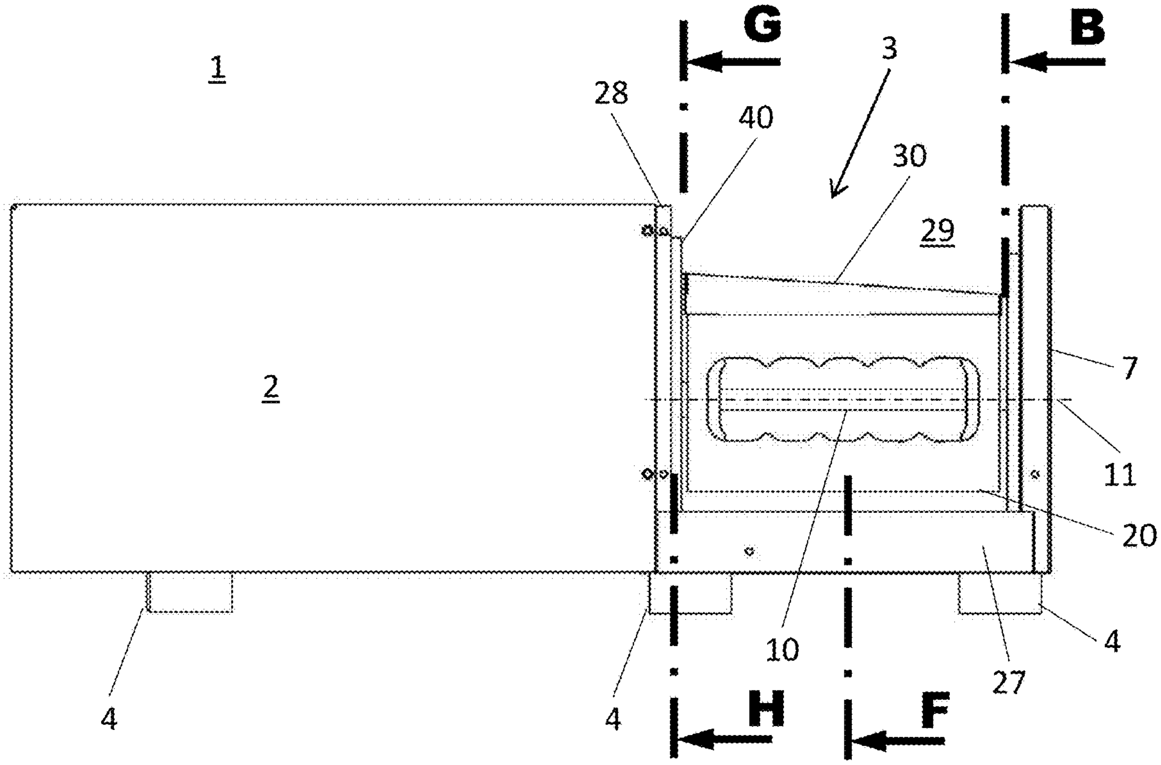
Figure 4B:
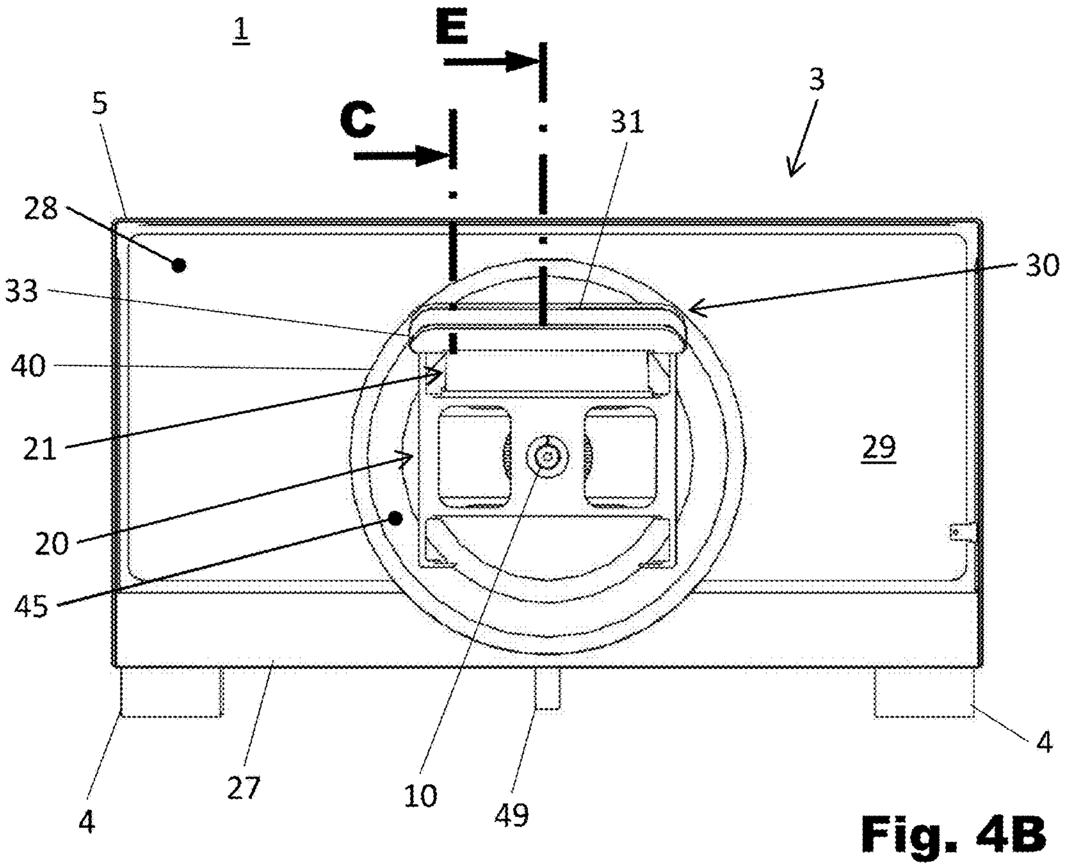
Figure 4C:
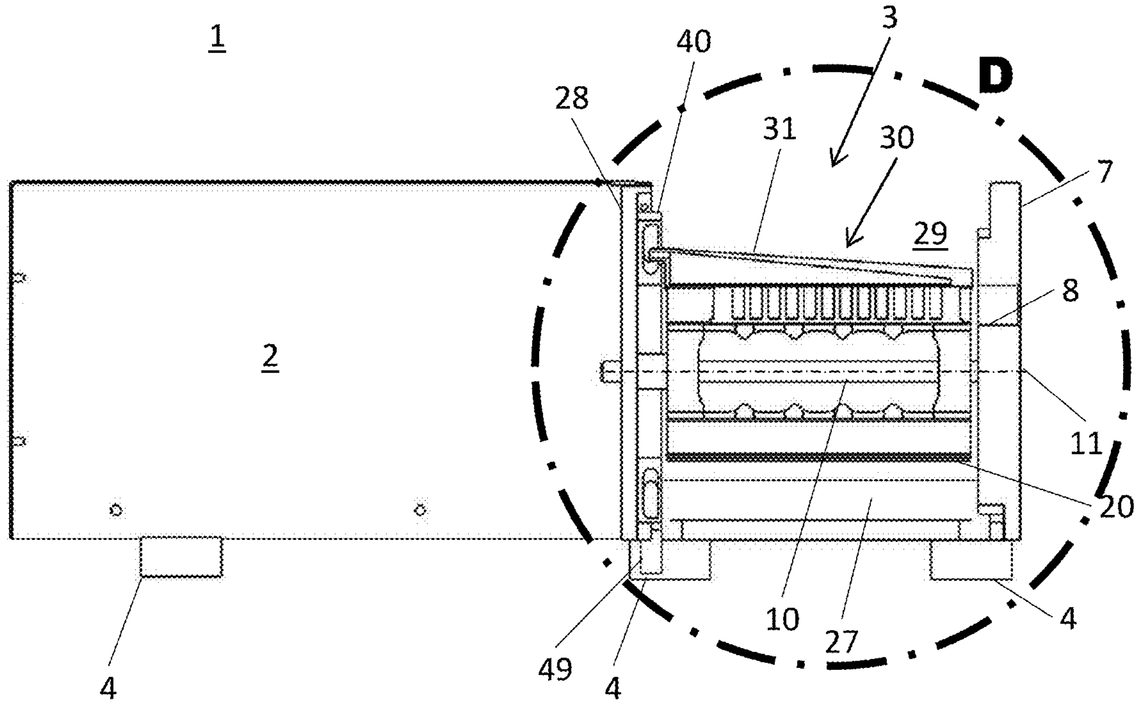
Figure 4D:
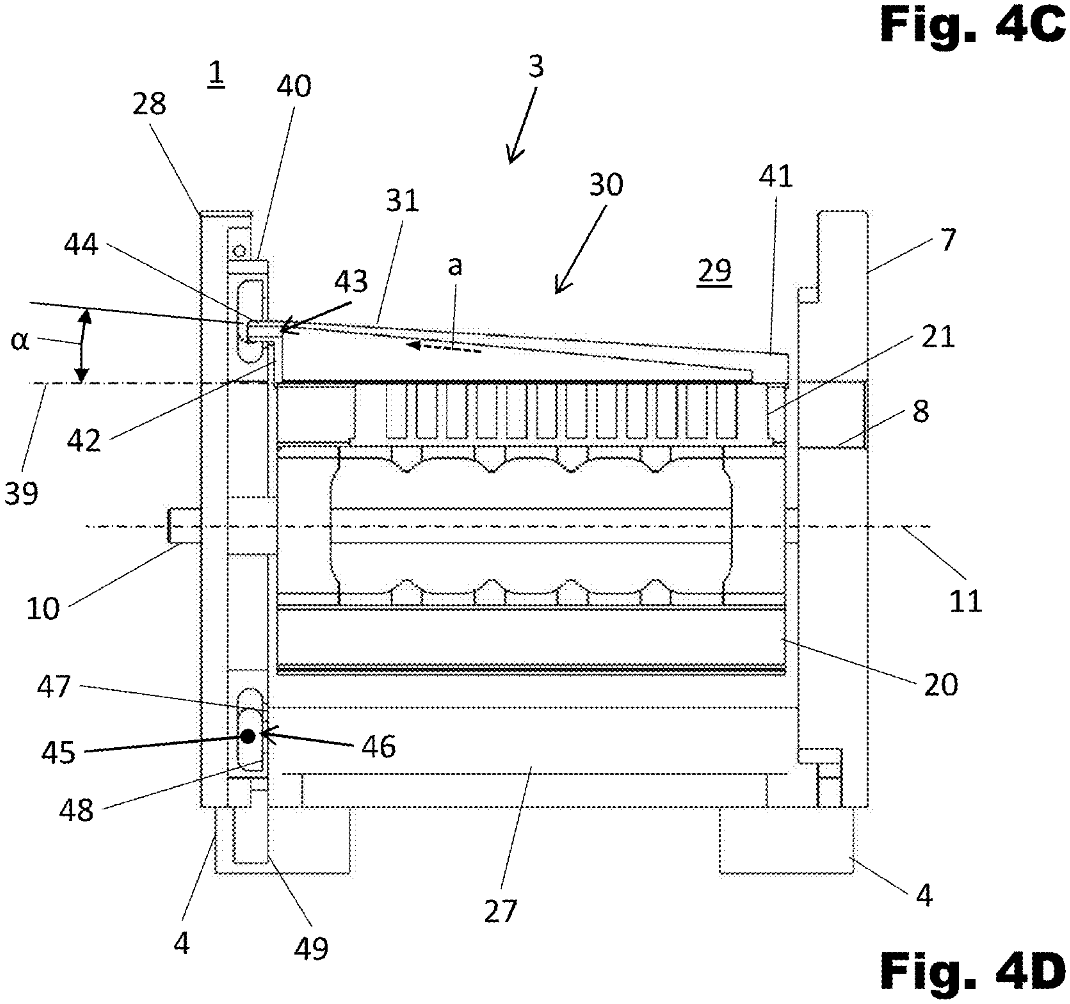
Figure 4E:
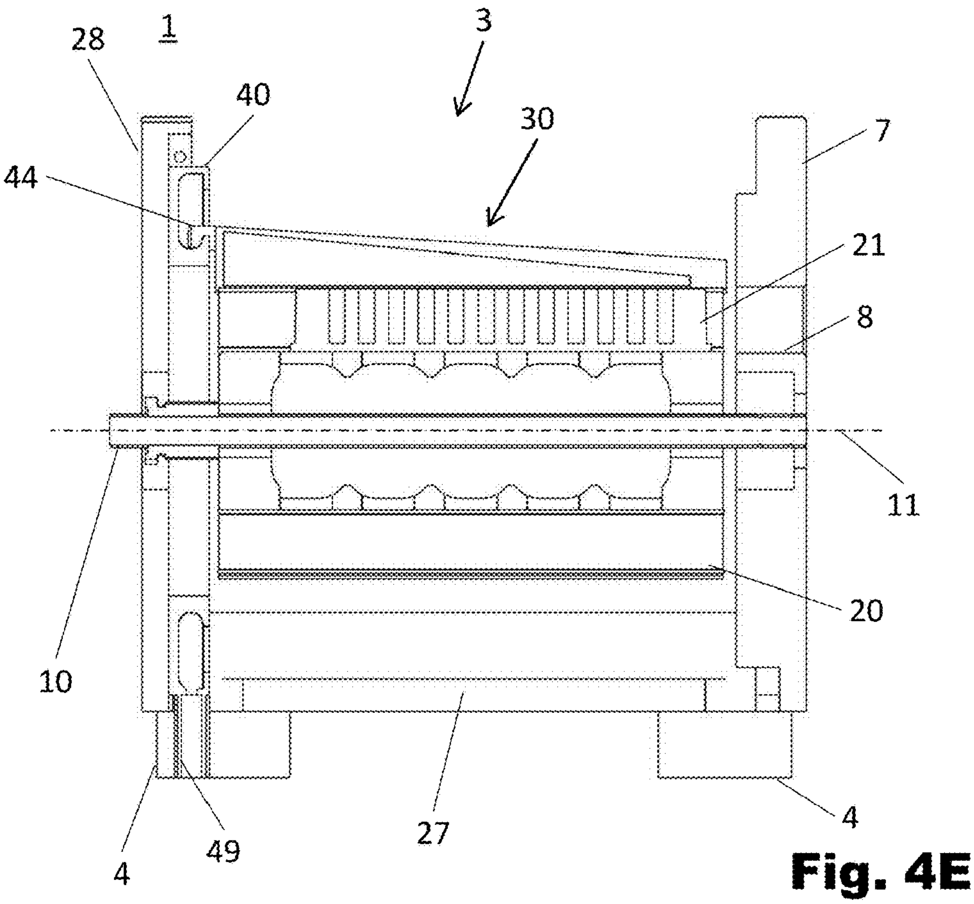
Figure 4F:
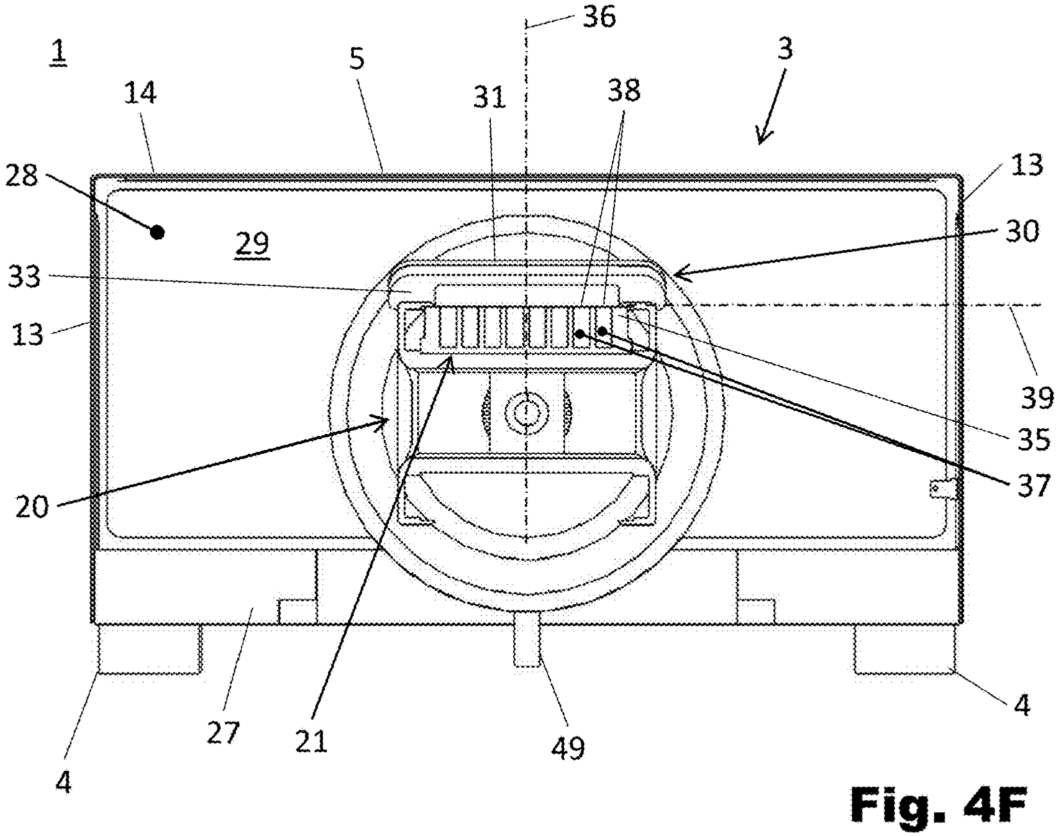
Figure 4G:
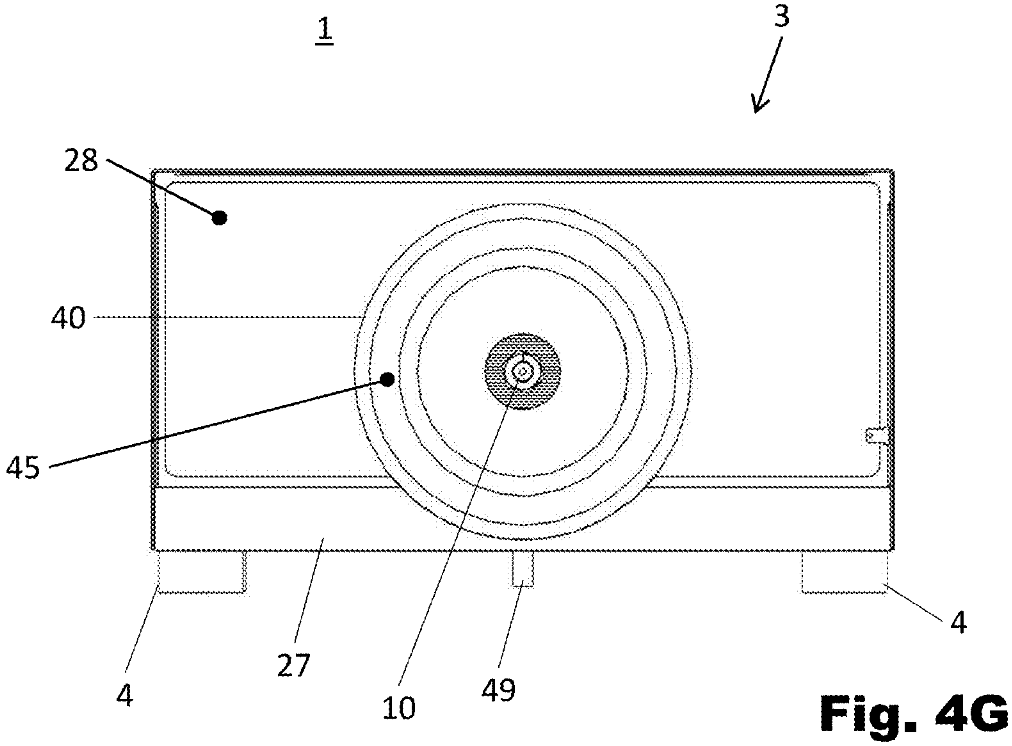
Figure 4H:
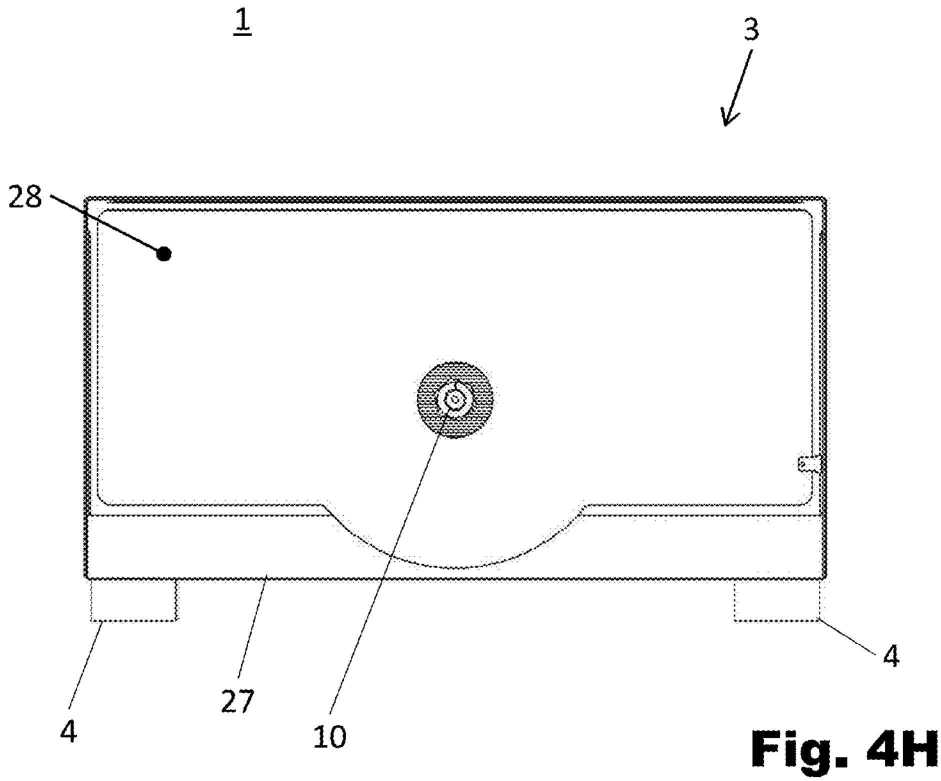
Figure 5A:
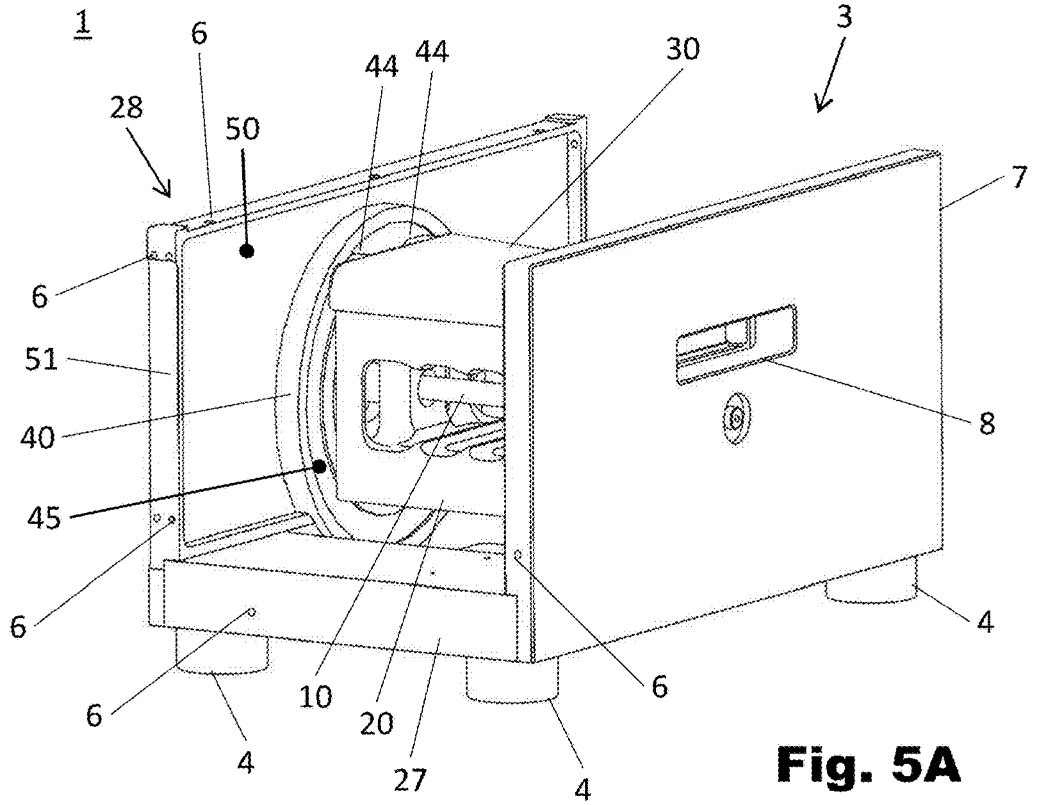
Figure 5B:
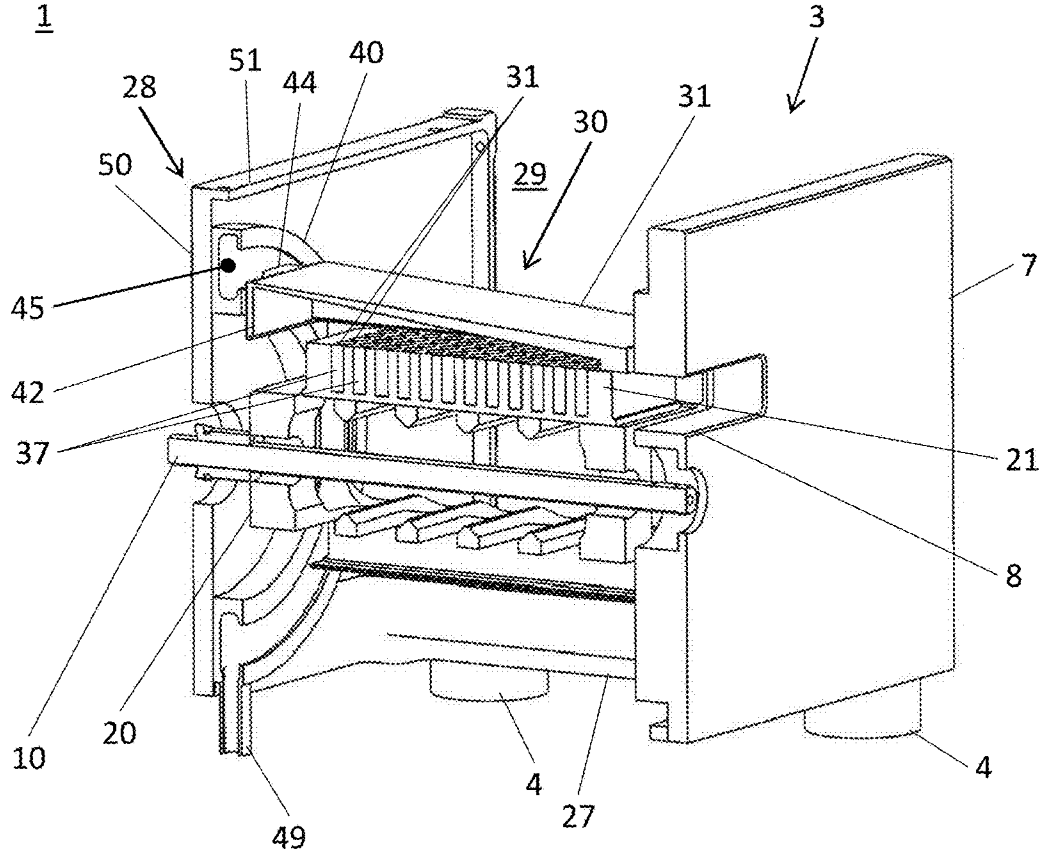
Figure 6A:
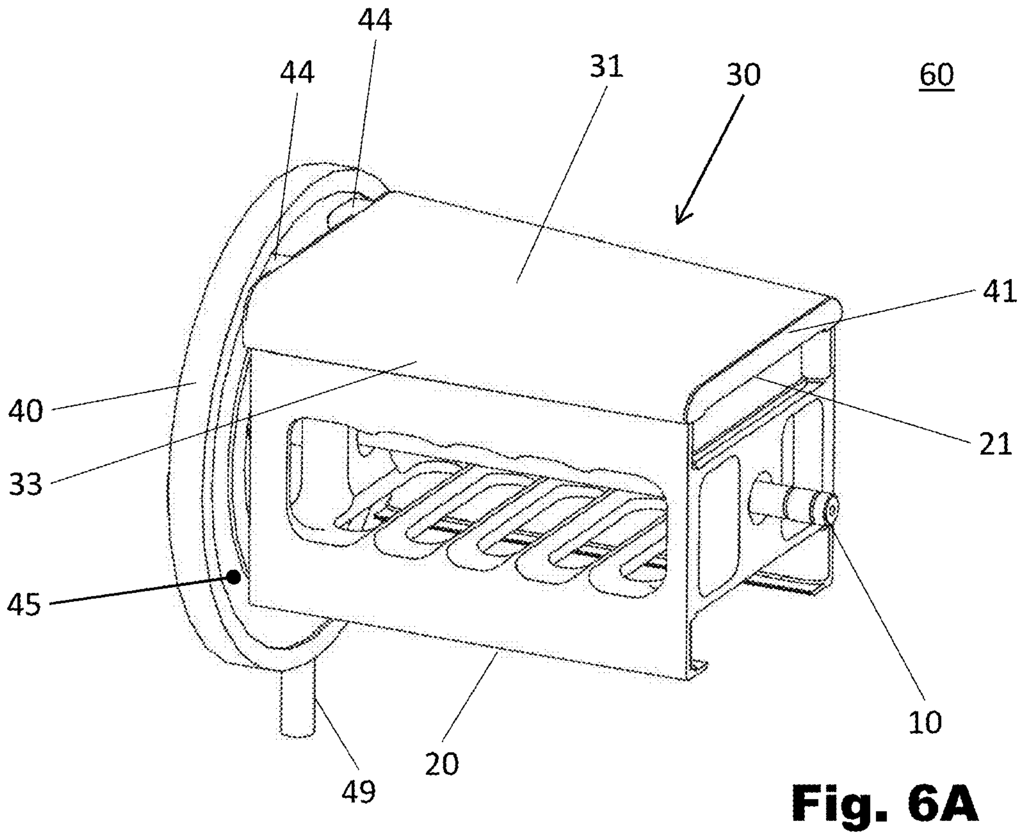
Figure 6B:
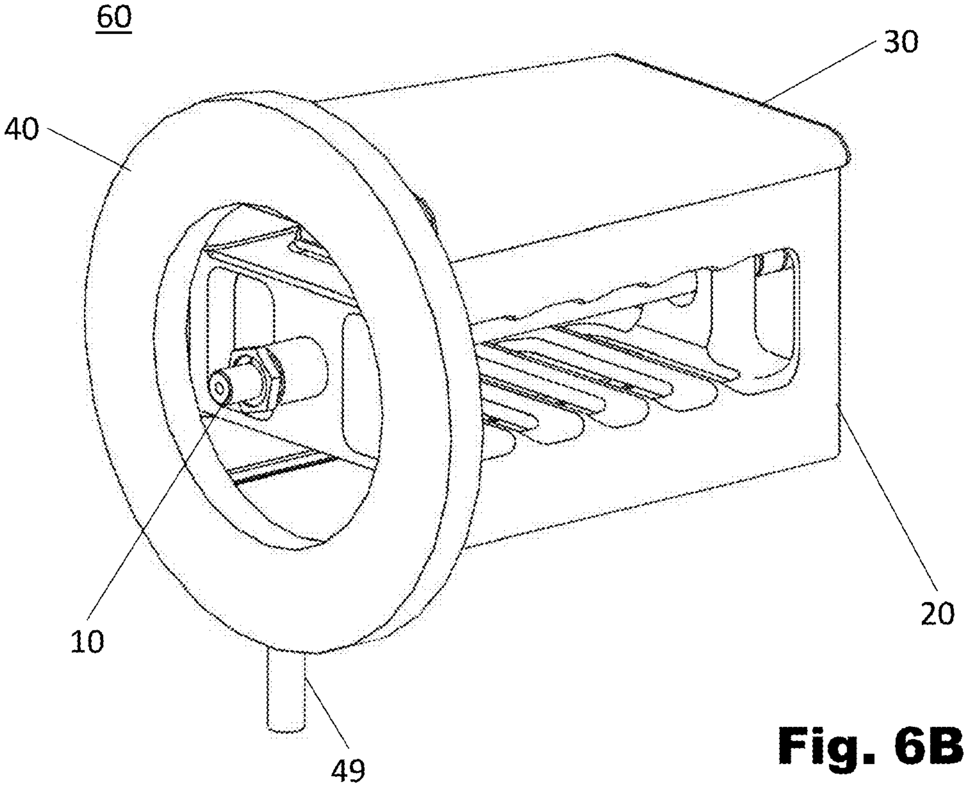
Figure 6C:
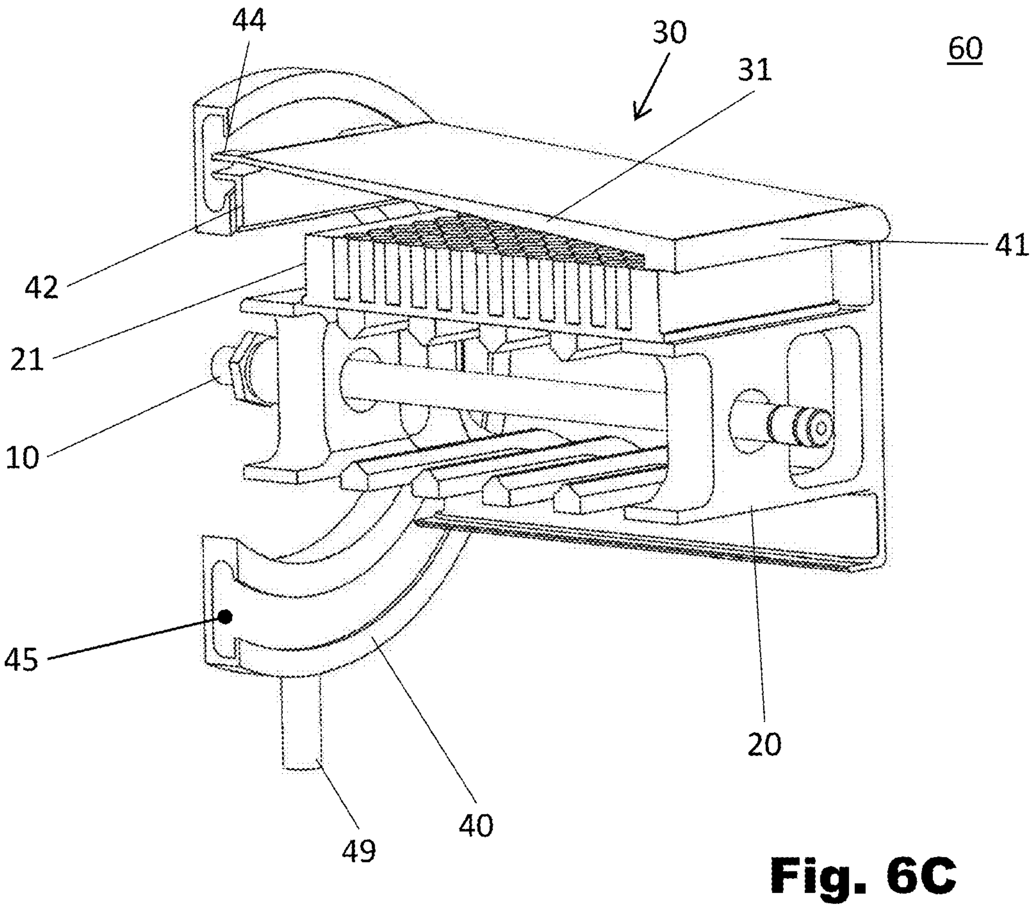
Figure 7A:
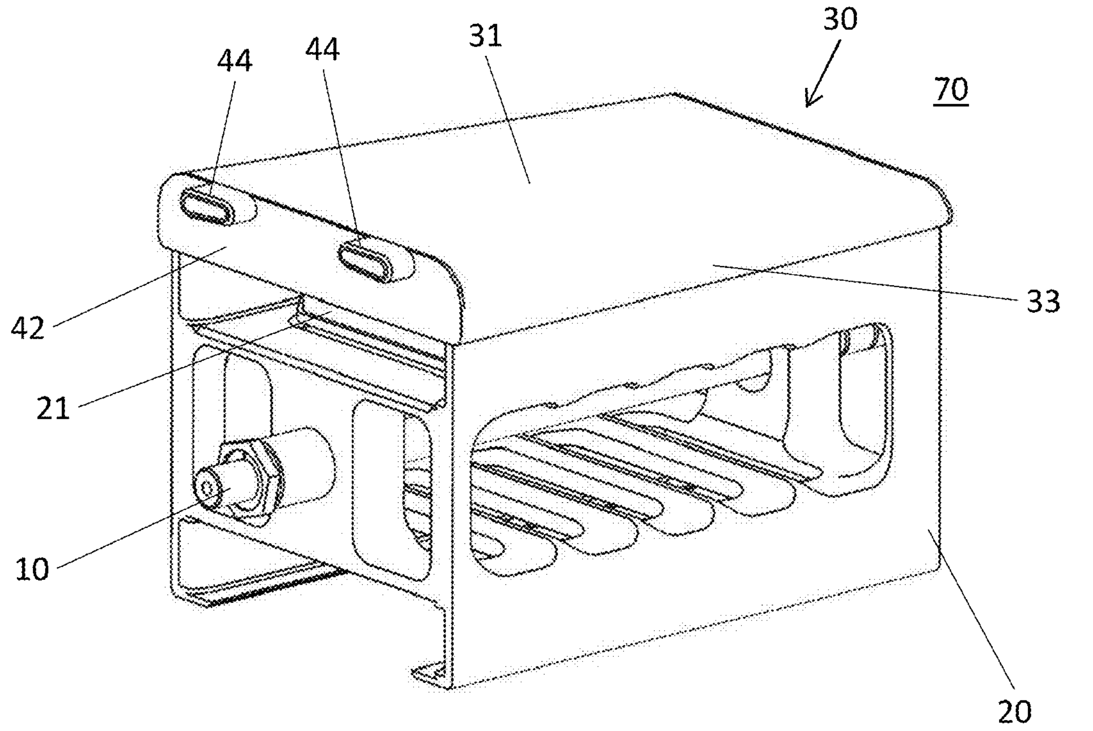
Figure 7B:
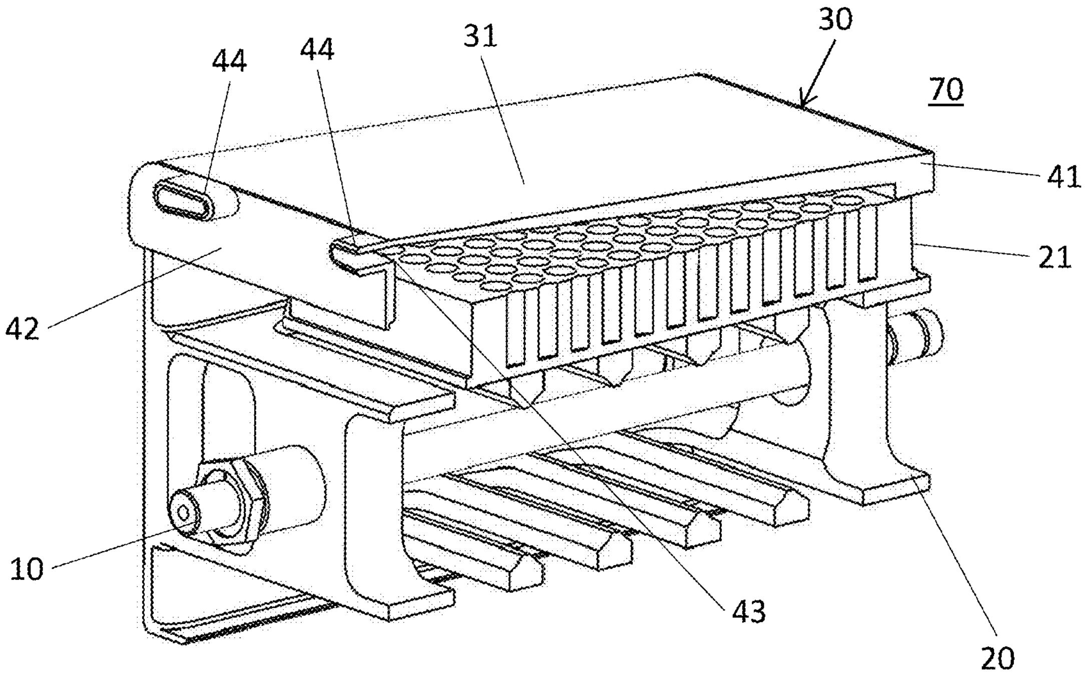
Figure 8:
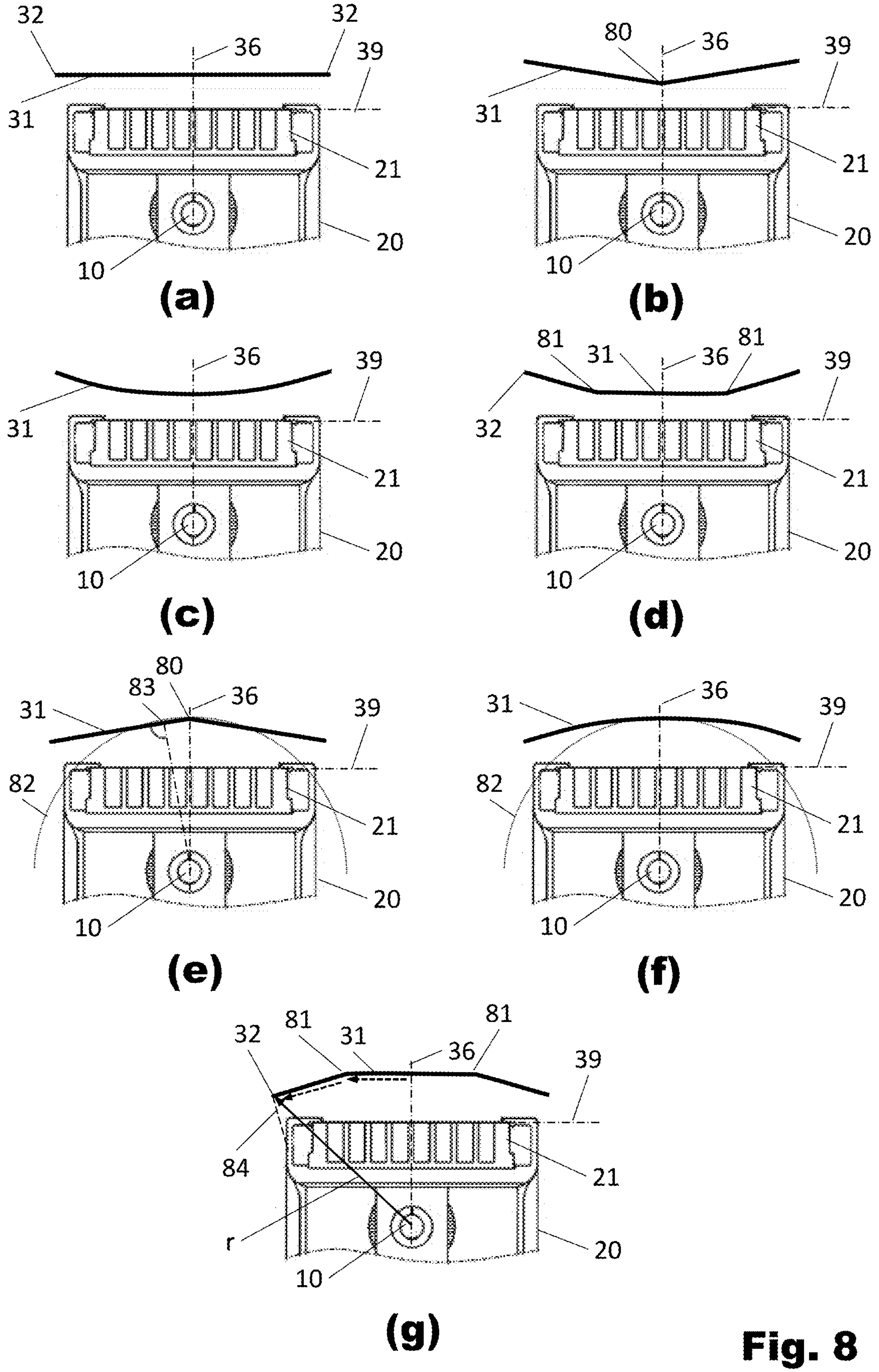
Figure 9:
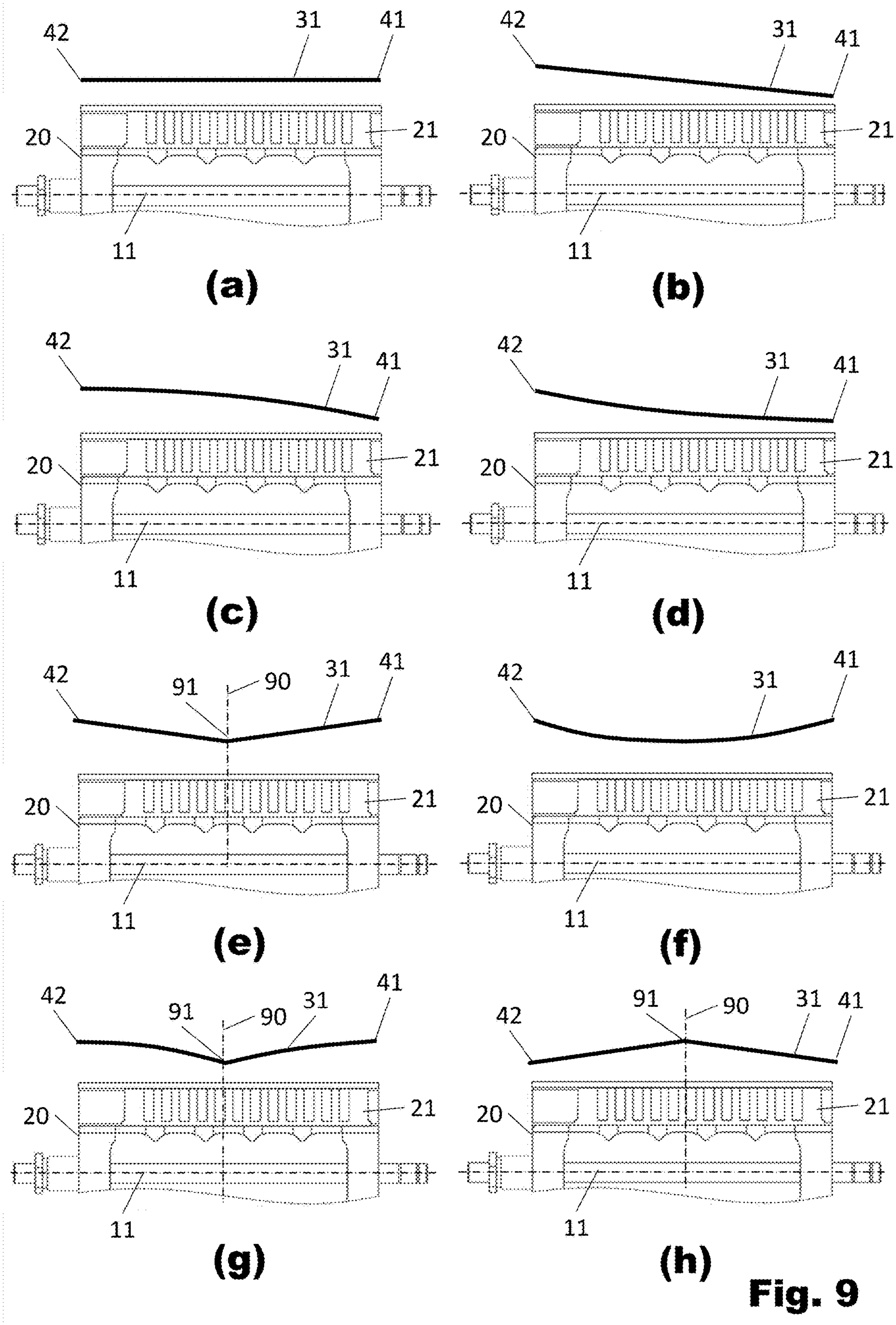

Selected embodiments of the present invention are described in detail below with reference to the accompanying drawings. It shows/they show:

FIG. 1A A side view of a centrifuge from the outside;

FIG. 1B The centrifuge of FIG. 1A in a frontal view in the direction of an arrow “B” in FIG. 1A;

FIG. 2 An interior of a rotor box of the centrifuge of FIGS. 1A, 1B with a reaction vessel unit without discharge device in an end view with the end wall removed;

FIG. 3 The interior of the rotor box of FIG. 2 with a reaction vessel unit and with a discharge device according to the invention in an end-face sectional view corresponding to a sectional plane indicated in FIG. 1A by a line “Ill”;

FIG. 4A The centrifuge in a side view as shown in FIG. 1A with the hood removed;

FIG. 4B The centrifuge of FIG. 4A in a frontal view in the direction of an arrow “B” in FIG. 4A;

FIG. 4C The centrifuge of FIG. 4A with the hood removed, wherein a rotor box and elements therein are cut along a plane “C” in FIG. 4B;

FIG. 4D The rotor box of the centrifuge from FIG. 4A in an enlarged view corresponding to a section “D” in FIG. 4C;

FIG. 4E The rotor box of FIG. 4A in a side view cut along a plane “E” in FIG. 4B;

FIGS. 4F,4G,4H The centrifuge of FIG. 4A in a frontal view in the direction of an arrow “F”, “G” and “H” in FIG. 4A;

FIG. 5A Perspective view of the rotor box of the centrifuge from FIG. 4A;

FIG. 5B The rotor box from FIG. 5A in a perspective view cut along the plane “E” in FIG. 4B;

FIG. 6A Perspective view of an assembly with rotor shaft, rotor, discharge device and collecting device in the centrifuge with reaction vessel unit accommodated therein;

FIG. 6B The assembly of FIG. 6A in another perspective view;

FIG. 6C The assembly of FIG. 6A cut along the plane “C” in FIG. 4B;

FIG. 7A Perspective view of an assembly with rotor shaft, rotor and discharge device in the centrifuge with reaction vessel unit accommodated therein;

FIG. 7B The assembly of FIG. 7A cut along the plane “C” in FIG. 4B;

FIG. 8 Variants (a) to (g) of a contour of the discharge plate with reaction vessel unit on a rotor in cross-section transverse or perpendicular to the rotation axis;

FIG. 9 Variants (a) to (h) of a contour of the discharge plate with reaction vessel unit on a rotor in an axial section along the rotation axis.

All graphic representations are to be understood schematically. Size ratios may be distorted for clarification. Unless otherwise indicated, directional and positional designations refer to the normal use of the subject of the invention.

A centrifuge 1 has a drive box 2 and a rotor box 3, which rest on feet 4 (FIGS. 1A, 1B). The drive box 2 houses a drive unit, such as an electric motor (not shown in detail). The drive box 2 has a hood 5, which is attached to a support structure of the rotor box 3 by means of screws 6. The support structure can be formed by an end wall 7 as well as by a base 27 and a rear wall 28 of the rotor box 3 (see, for example, FIG. 5A with screw holes 53 for mounting the hood 5). The hood 5 can have two side walls 13 and an upper wall 14, which are formed as individual elements or as a continuous angled sheet metal structure (see FIG. 2). The side walls 13 and the upper wall 14 of the hood 5 as well as the end wall 7, a base 27 and a rear wall 28 of the rotor box 3 define or surround an interior of the rotor box 3, which is also referred to as a rotor chamber 29. The end wall 7 has a loading window 8 (see FIG. 1B), via which an interior of the rotor box 3 is accessible in order to load the centrifuge with a reaction vessel unit 21 (FIG. 2), as is known per se. The end wall 7 can also have an axle opening 9 (FIG. 1B), which accommodates a rotor shaft 10 of the centrifuge 1 for rotation about a rotation axis 11. The axle opening 9 can also be designed as a bearing seat for a bearing 12 for mounting the rotor shaft, but the rotor shaft can also run freely in the axle opening 9.

The rotor shaft 10 carries a rotor 20, which is connected to the rotor shaft 10 in a rotationally fixed manner in order to rotate in an interior of the rotor box 3 (FIG. 2). For this purpose, the rotor shaft 10 is connected to an output shaft of the drive unit of the centrifuge 1. Alternatively, it is also conceivable that the rotor shaft 10 is an integral part of the output shaft of the drive unit. The rotor 20 is designed to accommodate at least one reaction vessel unit 21; in the present embodiment example, the rotor 20 can accommodate two reaction vessel units 21, of which only one is shown in the figure. The rotor 20 has a frame 22, which is approximately cuboid in shape and is connected or can be connected to the rotor shaft 10 in a rotationally fixed manner. On each of two axially opposite sides of the frame 22, a receiving location 23 is formed for a reaction vessel unit 21. In embodiments, only a single receiving location 23 or more than two receiving locations 23 can also be provided. The receiving location 23 is delimited by two rail-like clamps 24, which project from the frame 22. A support surface 25 for the reaction vessel unit 21 is formed on the frame 22 itself, while respective counter surfaces 26 are formed on the clamps 24, which are formed parallel to the support surface 25 and are spaced apart from the latter to fit in accordance with a height of the reaction vessel unit 21. The reaction vessel unit 21 can be placed on or removed from the rotor 20 in a manner known per se via the loading window 8 in the end wall 7 when the rotor 20 is in a position in which the receiving location 23 is exactly opposite the loading window 8. The loading process can be carried out automatically by means of a loading device, as is known from WO 2017/125598 A1. For this purpose, the loading device has an automatically operable displacement rod (not shown) for positioning a reaction vessel unit.

The reaction vessel unit 21 is a body with a plurality of individual reaction vessels 37, which are arranged next to one another in the reaction vessel unit 21 and each have an opening 38 on one side (FIG. 3). The openings 38 lie in a common opening plane 39 and point radially outwards for cleaning purposes. The clamps 24 of the holding positions 23 are designed in such a way that they grip the reaction vessel unit 21 only at the edge, so that the openings 38 of the individual reaction vessels 37 of the reaction vessel unit 21 are exposed. When the rotor 20 rotates about the rotation axis 11 at a suitable rotational speed, liquids contained in the reaction vessels 37 of the reaction vessel unit 21 can be projected radially outwards. The liquid ejected from the reaction vessel unit 21 can be collected by the walls of the rotor chamber 29, in particular the inner sides of the side walls 13 and the upper wall 14 of the hood 5 as well as an upper width of the base 27, run off downwards from there and, if necessary, be collected and discharged, as is known per se. The rotational speed for this is a few 100 to a few 1000 rpm.

According to an embodiment example of the present invention, a discharge device 30 is provided, which is arranged radially outside the reaction vessel unit 21 (FIG. 3). The discharge device 30 has a discharge plate 31 which is arranged opposite the openings 38 of the reaction vessels 37. The discharge plate 31 extends beyond the dimensions of the rotor 20 both in the width direction w and in the axial direction (direction of the rotation axis 11). In modifications, it may be sufficient if the discharge plate 31 covers at least the reaction vessel unit 21 or at least all openings 38 of the reaction vessels 37 of the reaction vessel unit 21. When the rotor 20 rotates at a rotational speed suitable for centrifugation, liquid from the reaction vessels 37 is thrown through the openings 38 by the effect of the centrifugal force and intercepted by the discharge plate 31. In the area of a centre plane 36, which runs at right angles through the opening plane 39 of the reaction vessel unit 21 and along the rotation axis 11, a radial distance $r_0$ of the discharge plate 31 to the rotation axis 11 is the smallest, while the radial distance r increases in the width direction r towards the edge 32 of the deflector device. Accordingly, centrifugal acceleration also increases towards the edge 32 of the deflector 30, so that the collected liquid is driven along a surface of the discharge plate 31 in the width direction w towards the edge 32. A flank 33 of the deflector device 30 adjacent to the edge 32 of the discharge plate 31 can be open, so that the liquid driven outwards is driven further beyond the edge 32 by the centrifugal acceleration and ejected into the rotor chamber 29. If the rotor 20 remains in the position in which the reaction vessel unit 21 can be removed via the loading window 8 of the end wall 7, the discharge device 32 prevents liquid dripping down from the upper wall 14 from returning to the reaction vessels 37, so that the reaction vessel unit 21 can be removed cleanly. In this way, cross-contamination processes can be effectively prevented when centrifuging several reaction vessel units 21 with different fillings.

If the edge 32 of the discharge plate 31 is arranged laterally offset from the reaction vessel unit 21 and is also drawn downwards, i.e. towards the rotor, a drip edge can also be formed, from which liquid can drip down next to the rotor 20 when the rotor 20 is stationary.

The edge 32 of the discharge plate 31 can also be pulled down so far that it retains the liquid ejected from the reaction vessel unit 21 during rotation and this only drips down the side of the rotor 20 when the rotor comes to a standstill. This can also significantly reduce wetting of the inner walls of the rotor chamber 29.

The deflector 30 may be integral with the rotor 20 or attached or attachable thereto. In particular, the deflector 30 can be removable from the rotor 20 so that it can be cleaned separately. The deflector 30 can also be attached to the rotor shaft 10 independently of the rotor 20 (not shown in detail).

In a further embodiment example, the discharge plate 31 of the deflector device 30 is designed to rise from a front end face 41 to an opposite rear end face 42 of the deflector device 30 (FIGS. 4A to 7B). This embodiment example is a preferred modification of the embodiment example of FIG. 3 and makes use of its features, unless otherwise described below. Here, the front end 41 is located on the side of the end wall 7 of the rotor box 3 as viewed in the axial direction, and the rear end 42 of the discharge device 30 is located on the side of the rear wall 28 of the rotor box 3 as viewed in the axial direction. In other words, the discharge plate 31 has an incline which, in relation to the rotation axis 11 of the rotor 20, is designed to rise towards the rear end face 42 of the deflector device 30 and thus towards the rear wall 28 of the rotor box 3. An inner side of the discharge plate 31 forms a deflection angle α with the rotation axis 11 of the rotor 20 or with the opening plane 39 of a reaction vessel unit 21 held on the rotor 20 (FIGS. 4A, 4C). During the centrifugation process at a rotational speed, liquid trapped on the discharge plate 31 is therefore driven along the incline (arrow direction a in FIG. 4C) to the rear end 42 of the discharge device 30. Two discharge openings 43 are formed in the rear end face 42, each of which is connected to a spout 44 projecting from the rear end face 42 in the axial direction.

A collecting device 40 is provided on the rear wall 28 of the rotor box 3, which is adjacent to the drive box 2. The collecting device 40 can be formed integrally with the rear wall 28 or manufactured separately and connected to the rear wall 28. (It should be noted that the collecting device is also shown schematically in FIGS. 2 and 3, but is not functionally required there). In the present embodiment example, the collecting device 40 is a ring- or disc-shaped structure which is arranged on an inner side of the rear wall 28. However, the invention is not limited to this shape, and the collecting device 40 can in principle have any shape that is suitable for collecting and draining the liquid.

On the side facing the rotor 20, i.e. the inside, an annular channel 45 is formed in the collecting device 40. The channel 45 has an annular opening 46 pointing in the axial direction towards the rotor chamber 29. Behind the annular opening 46, the channel 45 widens radially inwards and radially outwards to form an inner undercut 47 and an outer undercut 48 with the annular opening 46. At the lowest point, the collecting device 40 has a drain device 49, which is connected to the channel 45. The two spouts 44 of the discharge device 30 protrude through the annular opening 46 into the channel 45. The liquid collected by the discharge device 30 on the discharge plate 31 collects under the effect of centrifugal acceleration at the outer (flank-side) ends of the rear end 42 of the discharge device 31 in the width direction. From there, it passes through the drain openings 43 into the spouts 44 and is discharged from there into the channel 45. In the channel 45, the liquid can flow downwards and be removed from the rotor chamber 29 through the drain device 49.

As all of the liquid ejected from the reaction vessel unit 21 is collected in the channel 45, the interior of the rotor box 3 (the rotor chamber 29) remains largely unwetted by the liquid. Only mist produced by turbulence can enter the rotor chamber 29 from the channel 45 and wet its walls.

In a preferred embodiment, the discharge device 31 is designed such that it is flush with the lateral edges of the reaction vessel unit 21 and/or the rotor with flanks 33 or lateral walls, so that a substantially enclosed space is formed. As a result, the atmosphere inside the discharge device 31 is entrained when the rotor rotates and is not or only barely swirled. This prevents the formation of aerosols that are distributed in the rotor chamber 29.

Only if the formation of such a contaminated mist cannot be prevented is it necessary to clean the interior of the rotor box 3 from time to time. In principle, the cleaning intervals can be considerably extended compared to a centrifugation process without the discharge device 30 and collecting device 40. The discharge plate 31 reliably protects the reaction vessel unit 21 from any contamination by liquid dripping from the upper wall 14 of the hood 5. Since the deflector device 30 is also closed at the flanks 33, a closed space is formed with the reaction vessel unit 21 by the deflector device 30, so that any liquid mist which may prevail in the rotor chamber 29 cannot settle on a surface of the reaction vessel unit 21 and turbulence due to the rotation in the space between the reaction vessel unit 21 and the discharge plate 31 can be effectively prevented. The reaction vessel unit 21 can therefore be reliably and completely cleaned by centrifugation with the discharge device 30 of this embodiment example and protected from any wetting by the centrifugation process or contamination by falling droplets.

The invention has been described above with reference to preferred embodiments. It is understood that a wide variety of modifications are possible within the scope of protection of the invention. The shape of the discharge plate 31 depends on the desired effects. FIG. 8 schematically shows several variants 8(*a*) to 8(*g*) of a contour of the discharge plate 31 with reaction vessel unit 21 in a cross-section (radial section) perpendicular or radial to the rotation axis 11. FIG. 9 schematically shows several variants 9(*a*) to 9(*h*) of a contour of the discharge plate 31 with reaction vessel unit 21 in an axial section along the rotation axis 11. It is understood that further variants are conceivable in each case. The cross-sectional shapes of FIGS. 8 and 9 can be combined as desired. They can be designed with open or closed flanks.

The discharge plate 31 can be flat (FIG. 8(*a*)) in cross-section perpendicular to the rotation axis (FIG. 8)), with a central kink 80 along the rotation axis (FIGS. 8(*b*), (*e*)), with two lateral kinks along the rotation axis (FIGS. 8(*d, g*)) or curved (c, f), concave (FIGS. 8(*b*), (*c*), (*d*)) or convex (FIGS. 8(*e*), (*f*), (*g*)) when viewed from the outside. As described in connection with FIG. 2, the centrifugal acceleration in the cross-sectional plane transverse to the rotation axis 11 always acts in the direction of the larger radius r, therefore liquid collected on the inside of the discharge plate 31 will be driven towards the flank-side edges 32 even if the discharge plate is flat (FIG. 8(*a*)). This effect can be enhanced by a concave design, in which the edges 32 are drawn away (upwards) from the rotation axis (FIGS. 8(*b*), (*c*), (*d*)), but weakened by a convex design, in which the edges 32 are drawn towards the rotation axis (downwards) (FIGS. 8(*b*), (*c*), (*d*)). In the case of a convex shape with a central kink 80 (FIG. 8(*e*)), the discharge plate initially inclines more steeply than a circumference 82 around the rotation axis. Therefore, liquid can accumulate in the area around the central bend 80 up to a reversal point 83, from which the discharge plate 31 falls flatter than the circumference 82. To avoid this, the shape with two lateral kinks 81, which are arranged beyond the reversal point 83, is preferable, as the liquid is then reliably drained from the central area to the outside (FIG. 8(*g*)). For the same reason, it is advantageous if the radius of curvature of the discharge plate 31 (FIG. 8(*f*)) is greater than the radial distance of the discharge plate 31 at the point closest to the axis, i.e. in the area of the centre plane 36, when the discharge plate 31 is convexly curved in cross-section.

In an axial section along the rotation axis (FIG. 9), the discharge plate 31 can be flat, i.e. at the same distance from the rotation axis 11 (FIG. 9(*a*)), inclined on one side, i.e. rising from a first end face 41 to a second end face 42 (FIGS. 9(*b*)-(*d*)), inclined on both sides, i.e. rising towards both end faces 41, 42 (FIGS. 9(*e*)-(*g*)) or descending (FIG. 9(*h*)), wherein the incline may be straight (FIGS. 9(*b*), (*e*), (*h*)) or curved (FIGS. 9(*c*), (*d*), (*f*), (*g*)), concave (FIGS. 9(*d*), (*e*), (*f*)) or convex (FIGS. 9(*c*), (*g*)) when viewed from the outside, wherein the inclined shapes on both sides can have a kink 91 between the end faces 41, 42. Due to the axial incline, which rises towards one or both end faces 41, 42, liquid is diverted due to the centrifugal acceleration along the inside or underside of the discharge plate 31 to the respective end face 41, 42 towards which the incline rises. The flow velocity can be slowed down by a convex shape towards the respective end face and accelerated by a concave shape. In the case of axially inclined shapes, it makes sense if the flanks are closed or at least drawn down far enough to create an obstacle to the flow transverse to the rotation axis, so that the liquid is only diverted to the end face(s) towards which the incline rises, where the liquid can be collected without wetting the rotor chamber. If the incline is on one side, the structural effort required to collect the liquid is lower, as a collecting device for the drained liquid only needs to be provided on one side. This is preferably provided on a rear wall of the rotor chamber, as the liquid can then be reliably drained away from the front side from which the reaction vessel unit is loaded. In the case of very large quantities of liquid to be drained, an incline on both sides can be advantageous, as the liquid can then be collected more quickly. A double-sided contour of the drainage plate 31, which rises from the end faces 41, 42 towards a cross-section 90, can concentrate the liquid in a kink 91 at the two flank-side edges. There, the liquid can be ejected laterally through the respective discharge openings. If necessary, a channel-like annular collecting device can be provided in the rotor chamber in the area of the cross-section 90, which collects the liquid ejected there and drains it downwards.

Other variants are conceivable. For example, the discharge device 30 can have a trough shape without further discharge openings. In this variant, it is advantageous if the discharge device 30 is attached to the reaction vessel unit 21 outside the centrifuge 1 and the reaction vessel unit 21 is thus loaded into the centrifuge. In this case, the method should be modified so that the rotor remains in the lower position at the end of the centrifuging process, so that the discharge device 30 comes to rest below the reaction vessel unit 21, and the reaction vessel unit 21 with the discharge device 30 and the liquid collected therein is discharged through a discharge window (not shown in detail) in the end wall 7 and separated from the discharge device 30, and the discharge device 30 is then freed from the liquid, cleaned and made ready for a further centrifuging process. With such a variant, the rotor chamber remains free of the centrifuged liquid even without a collecting device installed in it. No discharge device needs to be provided on the rotor, and cleaning of the rotor chamber and the discharge device can be made even easier.

It should be noted that the embodiment shown in FIG. 2 corresponds to a combination of the cross-sectional shape 8(*a*) with the axial sectional shape 9(*a*) with open flanks, and the embodiment shown in FIGS. 3A to 7B corresponds to a combination of the cross-sectional shape 8(*a*) with the axial sectional shape 9(*b*) with closed flanks.

With the discharge device of the present invention, the centrifuge according to the invention and the associated method, cross-contamination between reaction vessel units can be prevented, wetting of the reaction vessel units by aerosols in the rotor chamber can be reduced or completely avoided, depending on the design of the discharge device, and contamination of the rotor chamber by ejected liquid can also be significantly reduced or completely avoided. The latter can considerably simplify cleaning of the rotor chamber. If the liquids are completely absorbed in the channel 45 of the collecting device 40 and leakage into the rotor chamber is prevented, a closed rotor chamber can be dispensed with if necessary. In other words, the end wall 7 and the hood 5, and possibly also the base 27 (provided the latter is not required for reasons of stability) of the rotor box 3 can be omitted. This can considerably simplify the loading and unloading process of the rotor 20.

LIST OF REFERENCE SYMBOLS

1 Centrifuge
2 Drive box
3 Rotor box
4 Feet
5 Hood
6 Screw
7 Front wall
8 Loading window
9 Axis opening
10 Rotor shaft
11 Rotation axis
12 Storage
13 Side wall
14 Upper wall
20 Rotor
21 Reaction vessel unit
22 Frame
23 Receiving location
24 Clamp
25 Support surface
26 Counterface
27 Base
28 Back wall
29 Rotor chamber
30 Discharge device
31 Discharge plate
32 Edge
33 Flank
35 Edge
36 Centre level
37 Reaction vessel
38 Opening
39 Opening level
40 Collection device
41 Front (first) end face
42 Rear (second) end face
43 Discharge opening
44 Spout
45 Channel
46 Annular opening
47 Internal undercut
48 Outer undercut
49 Drain device
50 Plate
51 Frame
60 Assembly
70 Assembly
80 Central kink
81 Lateral kink
82 Perimeter
83 Reversal point
84 Surface normal
90 Medium cross-section
91 Kink
A Discharge direction
R Radius
$r_0$ smallest radius
W Width direction
$\alpha$ Discharge angle This list is an integral part of the description.

The invention claimed is:

1. A discharge device for a reaction vessel unit, which has a plurality of reaction vessels, wherein the reaction vessels each have an opening, which lie in a common opening plane, wherein the discharge device has a discharge plate opposite the openings of the reaction vessels in a centrifuge to rotate with the reaction vessel unit during centrifuging and collect and drain off liquid emerging from the reaction vessels due to the centrifugal acceleration, wherein the discharge plate is oblique with respect to the opening plane in an axial direction of a rotation axis of a rotor of the centrifuge to discharge the collected liquid along the discharge plate in the axial direction of the rotation axis of the rotor of the centrifuge due to the centrifugal acceleration in the centrifuge, wherein at least one discharge opening is formed on an end face of the discharge device towards which the discharge plate rises, wherein the discharge opening has a spout which projects beyond the end face, and the spout is positioned to project into a collecting device arranged in a rotor chamber of the centrifuge and discharge the collected liquid into the collecting device, which is configured to receive the collected liquid from the spout and direct the received liquid to a drain.

2. The discharge device according to claim 1, wherein flanks of the discharge device extending laterally along the rotation axis are drawn downwards from the discharge plate to form an obstacle to movement of the liquid transversely to the rotation axis.

3. The discharge device according to claim 2, wherein the end face having the at least one discharge opening is one of a pair of end faces of the discharge device, and the flanks and the pair of end faces of the discharge device are designed to be flush with an edge of the reaction vessel unit.

4. The discharge device according to claim 1, wherein the at least one discharge opening is flush or substantially flush with a surface of the discharge plate that faces the opening plane of the reaction vessels.

5. The discharge device according to claim 1, wherein the discharge device can be placed loosely, positively, on the reaction vessel unit.

6. The discharge device according to claim 1, wherein the discharge device is detachably connectable to the reaction vessel unit.

7. The discharge device according to claim 1, wherein the discharge device is connectable to the rotor of the centrifuge in a detachable manner.

8. The discharge device according to claim 1, wherein the discharge device is integrally formed with the rotor of the centrifuge.

9. The discharge device according to claim 1, wherein the discharge device is connected or connectable to a rotor shaft of the centrifuge.

10. A centrifuge for cleaning a reaction vessel unit, having a drive, a rotor which can be coupled or is coupled to the drive, wherein the rotor is designed to accommodate a reaction vessel unit with a discharge device, the reaction vessel unit having a plurality of reaction vessels, wherein the reaction vessels each have an opening, which lie in a common opening plane, wherein the discharge device has a discharge plate opposite the openings of the reaction vessels in the centrifuge to rotate with the reaction vessel unit during centrifuging and collect and drain off liquid emerging from the reaction vessels due to the centrifugal acceleration, wherein the discharge plate is oblique with respect to the opening plane in an axial direction of a rotation axis of the rotor to discharge the collected liquid along the discharge plate in the axial direction of the rotation axis of the rotor of the centrifuge due to the centrifugal acceleration in the centrifuge, wherein at least one discharge opening is formed on an end face of the discharge device towards which the discharge plate rises, wherein the discharge opening has a spout which projects beyond the end face.

11. The centrifuge according to claim 10, wherein a collecting device is provided, which is arranged in a rotor chamber of the centrifuge, in which the rotor rotates, and which is designed to collect liquid discharged by the discharge device.

12. The centrifuge according to claim 11, wherein the collecting device has an annular channel which is open towards the rotor chamber and concentric to the rotation axis and which lies opposite the at least one discharge opening of the discharge device.

13. The centrifuge according to claim 12, wherein the channel is located opposite the discharge opening of the discharge device in the axial direction.

14. The centrifuge according to claim 10, wherein the channel has an annular opening formed axially towards the rotor chamber, wherein the annular opening has an undercut radially inwards and/or radially outwards.

15. The centrifuge according to claim 11, wherein a drain device is formed at a lower end of the collecting device.

16. A method for cleaning a reaction vessel unit which has a plurality of reaction vessels, wherein the reaction vessels each have an opening which lie in a common opening plane, wherein the reaction vessel unit is received on a rotor of the centrifuge with the openings of the plurality of reaction vessels facing outwards from a rotation axis of the rotor; and the rotor with the reaction vessel unit arranged thereon is rotated in the centrifuge so that a liquid contained in the reaction vessels is centrifuged out, wherein, the centrifuged liquid is collected by a discharge device with a discharge plate, which is arranged radially opposite the opening plane of the reaction vessels and rotates together with the reaction vessel unit, and is discharged along the discharge plate, wherein the discharge device has the discharge plate opposite the openings of the reaction vessels in the centrifuge to rotate with the reaction vessel unit during centrifuging and collect and drain off liquid emerging from the reaction vessels due to the centrifugal acceleration, wherein the discharge plate is oblique with respect to the opening plane in an axial direction of the rotation axis of the rotor to discharge the collected liquid along the discharge plate in the axial direction of the rotation axis of the rotor of the centrifuge due to the centrifugal acceleration in the centrifuge, wherein at least one discharge opening is formed on an end face of the discharge device towards which the discharge plate rises, wherein the discharge opening has a spout which projects beyond the end face.

17. The method according to claim 16, wherein the discharge device is cleaned after one or more centrifuging operations, wherein the cleaning is carried out by rinsing with a rinsing solution contained in the reaction vessel unit or by autoclaving and/or by chemical means and/or by irradiation.

18. The method according to claim 16, wherein a rotor chamber of the centrifuge is cleaned after a predetermined number of centrifuging operations, wherein the cleaning is carried out by rinsing with a rinsing solution contained in the reaction vessel unit or by separate cleaning of dismantled parts of the centrifuge which delimit the rotor chamber, by autoclaving and/or by chemical means and/or by irradiation.

* * * * *